(12) United States Patent
May

(10) Patent No.: US 12,514,855 B2
(45) Date of Patent: Jan. 6, 2026

(54) LEVOCETIRIZINE AND MONTELUKAST IN THE TREATMENT OF SEPSIS AND SYMPTOMS THEREOF

(71) Applicant: IRR, Inc., Santa Barbara, CA (US)

(72) Inventor: Bruce Chandler May, Santa Barbara, CA (US)

(73) Assignee: IRR, Inc., Santa Barbara, CA (US)

( * ) Notice: Subject to any disclaimer, the term of this patent is extended or adjusted under 35 U.S.C. 154(b) by 533 days.

(21) Appl. No.: 17/925,798

(22) PCT Filed: May 17, 2021

(86) PCT No.: PCT/US2021/032766
§ 371 (c)(1),
(2) Date: Nov. 16, 2022

(87) PCT Pub. No.: WO2021/236518
PCT Pub. Date: Nov. 25, 2021

(65) Prior Publication Data
US 2024/0000773 A1    Jan. 4, 2024

Related U.S. Application Data

(60) Provisional application No. 63/026,983, filed on May 19, 2020.

(51) Int. Cl.
*A61K 31/495* (2006.01)
*A61K 31/47* (2006.01)
*A61P 37/02* (2006.01)

(52) U.S. Cl.
CPC ............ *A61K 31/495* (2013.01); *A61K 31/47* (2013.01); *A61P 37/02* (2018.01)

(58) Field of Classification Search
None
See application file for complete search history.

(56) References Cited

U.S. PATENT DOCUMENTS

| | | |
|---|---|---|
| 4,801,612 A | 1/1989 | Wei et al. |
| 5,147,637 A | 9/1992 | Wright et al. |
| 5,211,958 A | 5/1993 | Akkerboom et al. |
| 5,540,225 A | 7/1996 | Schutt |
| 6,384,038 B1 | 5/2002 | Rubin |
| 6,790,849 B2 | 9/2004 | Rubin |
| 7,166,640 B2 | 1/2007 | Berg |
| 7,186,555 B1 | 3/2007 | Tracey et al. |
| 7,226,470 B2 | 6/2007 | Kemény et al. |
| 7,291,331 B1 | 11/2007 | Croft et al. |
| 7,589,076 B2 | 9/2009 | Rieger et al. |
| 9,044,479 B2 | 6/2015 | May |
| 9,522,148 B2 | 12/2016 | May |
| 9,669,025 B2 | 6/2017 | May |
| 9,669,026 B2 | 6/2017 | May |
| 9,925,183 B2 | 3/2018 | May |
| 9,937,166 B2 | 4/2018 | May |
| 10,195,193 B2 | 2/2019 | May |
| 10,201,537 B2 | 2/2019 | May |
| 10,206,919 B2 | 2/2019 | May |
| 10,792,281 B2 | 10/2020 | May |
| 11,103,500 B2 | 8/2021 | May |
| 11,344,545 B2 | 5/2022 | May |
| 11,590,125 B2 | 2/2023 | May |
| 2001/0025040 A1 | 9/2001 | Poppe et al. |
| 2001/0033872 A1 | 10/2001 | Corson et al. |
| 2001/0051624 A1 | 12/2001 | Jones |
| 2002/0006961 A1 | 1/2002 | Katz et al. |
| 2002/0052312 A1 | 5/2002 | Reiss et al. |
| 2004/0180868 A1 | 9/2004 | Mullally |
| 2005/0256131 A1 | 11/2005 | Coester |
| 2006/0263350 A1 | 11/2006 | Lane |
| 2007/0020352 A1 | 1/2007 | Tripp et al. |
| 2007/0025987 A1 | 2/2007 | Brunetta |
| 2007/0225285 A1 | 9/2007 | Hutchinson et al. |
| 2007/0244128 A1 | 10/2007 | Hutchinson et al. |
| 2008/0260644 A1 | 10/2008 | Cohen |
| 2010/0305080 A1 | 12/2010 | O'Shea |
| 2012/0040892 A9 | 2/2012 | Zimmer et al. |
| 2012/0053563 A1 | 3/2012 | Du |
| 2012/0071509 A1 | 3/2012 | Gore et al. |
| 2012/0190691 A1 | 7/2012 | Bouyssou et al. |

(Continued)

FOREIGN PATENT DOCUMENTS

| | | |
|---|---|---|
| CN | 102 895 661 | 1/2013 |
| CN | 103 505 731 | 1/2014 |

(Continued)

OTHER PUBLICATIONS

Ciebieda. American Journal of Rhinology & Allergy, 2011, 25(1), pp. e1-e6 (Year: 2011).*
Cecconi. Lancet, 2018, 392, 75-87 (Year: 2018).*
Al-Ahmad, Mona, "Omalizumab Therapy in Three Patients with Chronic Autoimmune Urticaria", Annals of Saudi Medicine, vol. 30, No. 6, Nov.-Dec. 2010, pp. 478-481.
Athanasiadis et al., "Urticarial Vasculitis With a Positive Autologous Serum Skin Test: Diagnosis and Successful Therapy", Allergy, 2006, vol. 61, pp. 1484-1485.
Bernier et al., "Consensus Guidelines for the Management of Radiation Dermatitis and Coexisting Acne-Like Rash in Patients Receiving Radiotherapy Plus EGFR Inhibitors for the Treatment of Squamous Cell Carcinoma of the Head and Neck", Annals of Oncology, vol. 19, 2008, pp. 142-149.

(Continued)

*Primary Examiner* — Noble E Jarrell
(74) *Attorney, Agent, or Firm* — Knobbe, Martens, Olson & Bear, LLP

(57) ABSTRACT

Certain embodiments described herein include methods and formulations for treating or preventing symptoms and conditions associated with sepsis. The methods and formulations include, but are not limited to, methods and formulations for delivering effective concentrations of levocetirizine and montelukast to a patient in need. The methods and formulations can comprise conventional and/or modified-release elements, providing for drug delivery to the patient.

15 Claims, 6 Drawing Sheets

(56) References Cited

U.S. PATENT DOCUMENTS

| | | |
|---|---|---|
| 2012/0263764 A1 | 10/2012 | Watson |
| 2013/0011395 A1 | 1/2013 | Spies et al. |
| 2013/0029949 A1 | 1/2013 | Hoffmann et al. |
| 2013/0030000 A1 | 1/2013 | Chobanian et al. |
| 2013/0030009 A1 | 1/2013 | Harish et al. |
| 2014/0343065 A1 | 11/2014 | Giovannini |
| 2015/0231133 A1 | 8/2015 | May |
| 2015/0352102 A1 | 12/2015 | May |
| 2017/0173001 A1 | 6/2017 | May |
| 2017/0296534 A1 | 10/2017 | May |
| 2017/0368059 A1 | 12/2017 | May |
| 2018/0185357 A1 | 7/2018 | May |
| 2019/0091218 A1 | 3/2019 | May |
| 2019/0298714 A1 | 10/2019 | May |
| 2020/0101067 A1 | 4/2020 | May |
| 2020/0323843 A1 | 10/2020 | May |
| 2022/0096465 A1 | 3/2022 | May |
| 2023/0190734 A1 | 6/2023 | May |

FOREIGN PATENT DOCUMENTS

| | | | |
|---|---|---|---|
| EP | 1 769 797 | 4/2007 | |
| EP | 2 520 292 | 7/2012 | |
| JP | 2001-511134 | 8/2001 | |
| JP | 2001-526232 | 12/2001 | |
| JP | 2002-511425 | 4/2002 | |
| JP | 2004-536097 | 12/2004 | |
| JP | 2009-520711 | 5/2009 | |
| JP | 2009-525952 | 7/2009 | |
| JP | 2011-500847 | 1/2011 | |
| JP | 2012-519207 | 8/2012 | |
| JP | 2013-528654 | 7/2013 | |
| KR | 10-2001-0033485 | 4/2001 | |
| RU | 2442789 | 6/2010 | |
| WO | WO 95/009652 | 4/1995 | |
| WO | WO 99/032125 | 7/1999 | |
| WO | WO 99/052553 | 10/1999 | |
| WO | WO 03/002098 | 1/2003 | |
| WO | WO 03/002109 | 1/2003 | |
| WO | WO 03/101434 | 12/2003 | |
| WO | WO 2006/010283 | 2/2006 | |
| WO | WO 2008/100539 | 8/2008 | |
| WO | WO 2008/106429 | 9/2008 | |
| WO | WO 2009/022327 | 2/2009 | |
| WO | WO 2009/055729 | 4/2009 | |
| WO | WO 2010/107404 | 9/2010 | |
| WO | WO 2011/003074 | 1/2011 | |
| WO | WO 2011/041462 | 4/2011 | |
| WO | WO 2011/094209 | 8/2011 | |
| WO | WO 2011/159821 | 12/2011 | |
| WO | WO 2012/064301 | 5/2012 | |
| WO | WO 2012/064305 | 5/2012 | |
| WO | WO 2012/092594 | 7/2012 | |
| WO | WO 2013/012199 | 1/2013 | |
| WO | WO 2013/013490 | 1/2013 | |
| WO | WO 2013/148366 | 10/2013 | |
| WO | WO-2013162135 A1 * | 10/2013 | ............... A61P 9/00 |
| WO | WO 2014/090990 | 6/2014 | |
| WO | WO 2014/164281 | 10/2014 | |
| WO | WO 2014/164282 | 10/2014 | |
| WO | WO 2014/164285 | 10/2014 | |
| WO | WO 2014/164299 | 10/2014 | |
| WO | WO 2016/044095 | 3/2016 | |
| WO | WO 2017/210417 | 12/2017 | |
| WO | WO 2021/236518 | 11/2021 | |

OTHER PUBLICATIONS

Bisgaard Hans, "A Randomized Trial of Montelukast in Respiratory Syncytial Virus Postbronchiolitis", American Journal of Respiratory and Critical Care Medicine, 2003, vol. 167, No. 3, pp. 379-383.

Borish MD, Larry, "Allergic Rhinitis: Systemic Inflammation and Implications for Management", The Journal of Allergy and Clinical Immunology, Dec. 1, 2003, pp. 1021-1031.

Ciebieada, MD et al., "Montelukast with Desloratadine or Levocetirizine for the Treatment of Persistent Allergic Rhinitis", Annals of Allergy, Asthma & Immunology, Nov. 2006, vol. 97, pp. 664-671.

Clinical Surgery, 1999, Oct. 3, vol. 54, No. 11, Special Issue, pp. 13-15.

Commission on Accreditation of Rehabilitation Facilities Medical Rehabilitation Standards Manual ("CARF"), Jul. 1, 2020-Jun. 30, 2021, p. 397.

Dávila et al., "Effect of H1 Antihistamines Upon the Cardiovascular System", Journal of Investigational Allergology and Clinical Immunology, 2006, vol. 16, No. 1, pp. 13-23.

Deb et al., "Pathophysiologic Mechanisms of Acute Ischemic Stroke: An Overview with Emphasis on Therapeutic Significance Beyond Thrombolysis", Pathophysiology, 2010, vol. 17, pp. 197-218.

Eccles, Ron, "Understanding the Symptoms of the Common Cold and Influenza", The Lancet Infectious Diseases, R(1) Nov. 2005, vol. 5, No. 11, pp. 718-725.

El-Shanawany et al., "Clinical Immunology Review Series: An Approach to the Patient with Anaphylaxis", British Society for Immunology, Clinical and Experimental Immunology, 2008, vol. 153, pp. 1-9.

Elting et al., "Comparison of Serum S-100 Protein Levels Following Stroke and Traumatic Brain Injury", Journal of the Neurological Sciences, 2000, vol. 181, pp. 104-110.

Fedson, David, "A Practical Treatment for Patients with Ebola Virus Disease", Journal of Infectious Diseases, Aug. 25, 2014, pp. 5.

Fedson, David, "Treating Influenza with Statins and Other Immunomodulatory Agents", Antiviral Research, Sep. 2013, vol. 99, No. 3, pp. 417-435.

Fookes, Carmen, "Methylprednisolone vs Prednisone—What's the difference between them?", Drugs.com, https://www.drugs.com/medical-answers/difference-between-methylprednisolone-prednisone-3509126/, as updated Aug. 17, 2021, pp. 3.

Garau et al., "Radiobiology of the Acute Radiation Syndrome", Reports of Practical Oncology and Radiotherapy, 2011, vol. 16, pp. 123-130.

Gil et al. "COVID-19: Drug Targets and Potential Treatments," Journal of Medical Chemistry, 2020, 63, pp. 12359-12386.

Glantschnig et al., "Mass Fraction Profiling Based on X-Ray Tomography and its Application to Characterizing Porous Silica Boules", Applied Optics, Mar. 15, 1987, vol. 26, No. 6, pp. 983-989.

Heneka et al., "Innate Immune Activation in Neurodegenerative Disease", Nature Reviews, Immunology, Jul. 2014, vol. 14, pp. 463-477.

Hong et al., "Urticaria and Angioedema", Cleveland Clinic—Center for Continuing Education, Aug. 2010, pp. 11.

Ingelsson et al., "Nationwide Cohort Study of the Leukotriene Receptor Antagonist Montelukast and Incident or Recurrent Cardiovascular Disease", Journal of Allergy and Clinical Immunology, Mar. 2012, vol. 129, No. 3, pp. 702-707.e2.

Jang et al., "Levoceterizine Inhibits Rhinovirus-Induced ICAM-1 and Cytokine Expression and Viral Replication in Airway Epithelial Cells", Antiviral Research, Mar. 2009, vol. 81, No. 3, pp. 226-233.

Jensen et al., "Sensing of RNA Viruses: a Review of Innate Immune Receptors Involved in Recognizing RNA Virus Invasion", Journal of Virology, Mar. 2012, vol. 86, No. 6, pp. 2900-2910.

Jianxin et al., "Therapeutic Effectiveness Analysis of Montelukast in Therapy of Anaphylactic Purpura", Journal of Clinical and Experimental Medicine, May 2010, vol. 9, No. 10, pp. 782-783.

Johnson, MD, et al., "Levocetirizine and Rupatadine in Chronic Idiopathic Urticaria", International Journal of Dermatology, 2015, vol. 54, pp. 1199-1204.

Khoury, MD et al., "Effect of Montelukast on Bacterial Sinusitis in Allergic Mice", Annals of Allergy, Asthma & Immunology, Sep. 2006, vol. 97, No. 3, pp. 329-335.

Kozel et al., "Chronic Urticaria: Aetiology, Management and Current and Future Treatment Options," Drugs, 2004, vol. 64, No. 22, pp. 2515-2536.

Kronenberg et al., "Symptomatic Treatment of Uncomplicated Lower Urinary Tract Infections in the Ambulatory Setting: Randomised, Double Blind Trial", BMJ, 2017, vol. 359, No. J4787, pp. 10.

(56) References Cited

OTHER PUBLICATIONS

Kuna et al., "Two Phase II Randomized Trials on the CR Th2 Antagonist AZD1981 in Adults with Asthma", Drug Design, Development and Therapy, 2016, vol. 10, pp. 2759-2770.

Kurowski et al., "Montelukast Plus Cetirizine in the Prophylactic Treatment of Seasonal Allergic Rhinitis: Influence of Clinical Symptoms and Nasal Allergic Inflammation", Allergy, 2004, vol. 59, pp. 280-288.

"Laboratory Tests Used in the Diagnosis and Monitoring of Rheumatoid Arthritis", National Rheumatoid Arthritis Society (NRAS), reviewed Nov. 4, 2019 and printed Sep. 2, 2020 in 4 pages. https://www.nras.org.uk/laboratory-tests-used-in-the-diagnosis-and-monitoring-of-rheumatoid-arthritis.

Lai et al., "Montelukast Targeting the Cysteinyl Leukotriene Receptor 1 Ameliorates Aβ1-42-Induced Memory Impairment and Neuroinflammatory and Apoptotic Responses in Mice", Neuropharmacology, Apr. 2014, vol. 79, pp. 707-714.

Lishchuk-Yakymovych et al., "Positive Correlation Between Serum IL-5 and TNF-alpha Levels and Churg-Strauss Syndrome Activity in Patients Successfully Treated with Motelukast", Journal of Allergy and Clinical Immunology, Entry 295, Feb. 2012, p. 1.

Luthra et al., "Mutual Antagonism between the Ebola Virus VP35 Protein and the RIG-1 Activator PACT Determines Infection Outcome", Cell Host Microbe, Jul. 17, 2013, vol. 14, No. 1, pp. 1-23.
"Making the Vaccine Decision: Addressing Common Concerns", Aug. 5, 2019, CDC Evidentiary reference, https://www.cdc.gov/vaccines/parents/why-vaccinate/vaccine-decision.htm-date accessed Jan. 27, 2022, pp. 4.
Mansi et al., "ANCA-Associated Small-Vessel Vasculitis", American Family Physician, Apr. 15, 2002, vol. 65, No. 8, pp. 1615-1620.
Marshall, III, M.D., William F., "COVID-19 (coronavirus) drugs: Are there any that work?" Mayo Clinic, Mayo Foundation for Medical Education and Research (MFMER). Jun. 2, 2021, 4 pages.
Mathis et al., "Role of Leukotriene B4 Receptors in Rheumatoid Arthritis", Autoimmunity Reviews, Nov. 2007, vol. 7, No. 1, pp. 12-17.
Mathiesen et al., "On the Mechanism of Interaction of Potent Surmountable and Insurmountable Antagonists with the Prostaglandin D2 Receptor CRTH2", Molecular Pharmacology, 2006, vol. 69, No. 4, pp. 1441-1453.
Matsen III M.D., "Rheumatoid Arthritis", https://orthop.washington.edu/patient-care/articles/arthritis/rheumatoid-arthritis.html, printed Aug. 30, 2021 in 11 pages.
Matteson, MD, MPH, "Current Treatment Strategies for Rheumatoid Arthritis", Mayo Clinic Proceedings, Concise Review for Clinicians, Jan. 1, 2000, vol. 75, No. 1, pp. 69-74.
May, B. Chandler, "A Proposed Model for the Treatment of Acute Inflammation", Mazatlán, Mexico, LXIV Conference of the Mexican College of Clinical Immunology and Allergy, May 29, 2010, pp. 3.
May, B. Chandler, "Contemporary Treatment of Influenza", Santa Barbara, CA, 25th Annual Infectious Disease Conference, Dec. 18, 2009, pp. 36.
McElroy et al., Ebola Hemorrhagic Fever: Novel Biomarker Correlates of Clinical Outcome, Journal of Infectious Disease, Aug. 15, 2014, vol. 210, No. 4, pp. 558-566.
McKinney et al., "The Immunopatholgy of ANCA-Associated Vasculitis", Semin Immunopathol, 2014, vol. 36, pp. 461-478.
Medrol®, Methylprednisolone tablets, USP, Pfizer, Revised Jul. 2018, pp. 13.
Medzhitov, Ruslan, "Origin and Physiological Roles of Inflammation," Nature, vol. 454, Jul. 24, 2008, pp. 428-435.
Menon, MD, PhD et al., "Positiona Statement: Definition of Traumatic Brain Injury", Archives of Physical Medicine and Rehabilitation, vol. 91, Nov. 2010, pp. 1637-1640.
Min et al., "Levocetirizine Inhibits Rhinovirus-Induced Bacterial Adhesion to Nasal Epithelial Cells Through Down-Regulation of Cell Adhesion Molecules", Annals of Allergy, Asthma and Immunology, 2012, vol. 108, pp. 44-48.
Modrykamien, MD et al., "The Acute Respiratory Distress Syndrome", Proceedings (Baylor University Medical Center) 2015, vol. 28, No. 2, pp. 163-171.
Moiz et al., "Formulation and Evaluation of Bilayered Tablets of Montelukast and Levocetrizine Dihydrocholoride Using Natural and Synthetic Polymers", International Journal of Drug Delivery 3, Jan. 2011, pp. 597-618.
Mostafa et al., "Comparative Study Evaluating Antihistamine Versus Leukotriene Receptor Antagonist as Adjuvant Therapy for Rheumatoid Arthritis", European Journal of Clinical Pharmacology, Jul. 4, 2021, pp. 10.
Muller, Barbara A., "Urticaria and Angioedema: A Practical Approach", American Family Physician, 2004, vol. 69, No. 5, pp. 1123-1128.
Murdoch et al., "Chronic Inflammation and Asthma", Mutation Research: Fundamental and Molecular Mechanisms of Mutagenesis, 2010, vol. 690, pp. 24-39.
Namazi, M.R. "Cetirizine and Allopurinol as Novel Weapons Against Cellular Autoimmune Disorders", International Immunopharmacology, 2004, vol. 4, pp. 349-353.
National Institute of Health (NIH), "Therapeutic Management of Hospitalized Adults with COVID-19" COVID-19 Treatment Guidelines, Jul. 8, 2021, 10 pages.
Nederkoorn et al., "Preventive Antibiotics in Stroke Study: Rationale and Protocol for a Randomised Trial", International Journal of Stroke, Apr. 2011, vol. 6, pp. 159-163.
Nonaka et al., "Prolonged Activation of NF-κB Following Traumatic Brain Injury in Rats", Journal of Neurotrauma, Nov. 1999, vol. 16, No. 11, pp. 1023-1034.
Parker, MD et al., "A 48 Year Old Man with Recurrent Sinusitis, 1 Year Later", JAMA, Clinical Crossroads Update, Jan. 24/31, 2001, vol. 285, No. 4, p. 462.
Pellicane, MD, et al., "Calorie and Protein Intake in Acute Rehabilitation Inpatients with Traumatic Spinal Cord Injury Versus Other Diagnoses", Topics in Spinal Cord Injury Rehabilitation, 2013, vol. 19, No. 3, pp. 229-235.
Permin et al., "Possible Role of Histamine in Rheumatoid Arthritis", Allergy, 1981, vol. 36, pp. 435-436.
Peroni et al., "Combined Cetirizine-Montelukast Preventative Treatment for Food-Dependent Exercise-Induced Anaphylaxis", Annals of Allery, Asthma, & Immunology, Mar. 2010, vol. 104, pp. 272-273.
Popov et al., "A Comparison of Levocetirizine and Desloratadine in the Histamine-Induced Wheal and Flare Response in Human Skin in Vivo", Inflammatory Research, Jun. 2006, vol. 55, No. 6, pp. 241-244.
"Prostaglandin DP2 receptor", Wikipedia, <https://en.wikipedia.org/wiki/Prostaglandin_DP2_receptor>, Aug. 25, 2017, pp. 9.
Pushparaj et al., "The Cytokine Interleukin-33 Mediates Anaphylactic Shock", with Retraction and Correction, Proceeding of the National Academy of Sciences of the United States of America (PNAS), Jun. 16, 2009, vol. 106, No. 24, pp. 9773-9778.
Quercia et al., "Adalimumab Desensitization after Anaphylactic Reaction", Allergy, 2010, vol. 65, No. 92, pp. 242-243.
Radlińska et al., "Montelukast—Recent Advances in Determining the Role of Leukotriene Inhibitor in Allergic Diseases", International Review of Allergology and Clinical Immunology, Jan. 2011, vol. 17:1-2, pp. 35-39.
Rosen et al., "New Approaches to Radiation Protection," Frontiers in Oncology, Jan. 20, 2015, vol. 4, No. 381, pp. 1-15.
Roumestan et al., "Histamine H1-receptor antagonists inhibit nuclear factor-kappaB and activator protein-1 activities via H1-receptor-dependent and -independent mechanisms", Clinical and Experimental Allergy, Jun. 2008, vol. 38, No. 6, pp. 947-956.
Schad et al., "Effect of Montelukast on Pro-inflammatory Cytokine Production During Naturally 174 Acquired Viral Upper Respiratory Infections (vURIs) in Adults", Journal of Allergy and Clinical Immunology, Elsevier, Amsterdam, NL, Feb. 2008, vol. 121, No. 2, p. S74.
Singh-Franco et al., "Levocetirizine for the Treatment of Allergic Rhinitis and Chronic Idiopathic Urticaria in Adults and Children", Clinical Therapeutics, vol. 31, No. 8, Aug. 2009, pp. 1664-1687.
Spiropoulou et al., "RIG-I Activation Inhibits ebolavirus Replication", Virology, 2009, 392, pp. 11-15.

(56) References Cited

OTHER PUBLICATIONS

Taber's® Cyclopedic Medical Dictionary, "Trauma", 18th Edition, 1997, pp. 1988-1989.

Tang, Angela, "A Practical Guide to Anaphylaxis", American Family Physician, Oct. 1, 2013, vol. 68, No. 7, pp. 1325-1333.

Tillement et al., "Compared Pharmacological Characteristics in Humans of Racemic Cetirizine and Levocetirizine, Two Histamine H1-Receptor Antagonists", Biochemical Pharmacology, 2003, pp. 1123-1126.

Tillie-Leblond et al., "Relation Between Inflammation and Symptoms in Asthma", Allergy, vol. 64, No. 3, Mar. 1, 2009, pp. 354-367.

Vasculitis Foundation, http://vasculitisfoundation.org/education/forms/urticarial-vasculitis/, 2017.

Williams et al., "Animal Models and Medical Countermeasures Development for Radiation-Induced Lung Damage: Report from an NIAID Workshop", Radiation Research, 2012, vol. 177, No. 5, pp. 25-39.

Wilson, D.C., "Effect of an Anti-Histamine in Rheumatoid Arthritis", Hospital for Rheumatic Diseases, Strathpeffer, Nov. 20, 1952, pp. 38-39.

Wong et al., "Characterization of Host Immune Responses in Ebola Virus Infections", Expert Review of Clinical Immunology, 2014, vol. 10, No. 6, pp. 781-790.

Wu et al., "Add-On Therapy with Montelukast in the Treatment of Henoch-Schönlein Purpura", Pediatrics International, 2014, vol. 56, pp. 315-322.

Yu et al., "Montelukast, a Cysteinyl Leukotriene Receptor-1 Antagonist, Dose- and Time-Dependently Protects Against Focal Cerebral Ischemia in Mice", Pharmacology, Jan. 2005, vol. 73, No. 1, pp. 31-40.

Zana, Larry, "Qrono—Reformulating known, approved drugs", as printed Jun. 23, 2014, pp. 12.

Zappalà et al., "Traumatic brain injury and the frontal lobes: What can we gain with diffusion tensor imaging?" Cortex, 2011, pp. 1-10.

Zhang et al., "Contrastive Observation of Loratadine and Cetirizine in Therapy of Anaphylactic Purpura", Chinese Remedies & Clinics, May 2008, pp. 65-66.

Khodir et al., "Montelukast Reduces Sepsis-Induced Lung and Renal Injury in Rats", Canadian Journal of Physiology and Pharmacology, Oct. 2014, vol. 92, No. 10, pp. 839-847.

Sener et al., "Amelioration of Sepsis-Induced Hepatic and Ileal Injury in Rats by the Leukotriene Receptor Blocker Montelukast", Prostaglandins Leukot Essent Fatty Acids, Dec. 2005, vol. 73, No. 6, pp. 453-462.

Extended European Search Report received in European Patent Application No. 21809416.7 dated Mar. 5, 2024 in 10 pages.

\* cited by examiner

LEVOCETIRIZINE AND MONTELUKAST IN THE TREATMENT OF SEPSIS AND SYMPTOMS THEREOF

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD

The disclosure generally relates to treating sepsis patients with the combination of levocetirizine and montelukast.

BACKGROUND

Sepsis is a life-threatening condition that arises when a dysregulated host response to infection causes injury to its own tissues and organs.

SUMMARY

Embodiments of compositions for treating a patient suffering from sepsis or a symptom thereof are disclosed. In some embodiments, the method comprises administering to the patient an effective amount of a combination of levocetirizine and montelukast. In some embodiments, the treatment causes a decrease in severity of the signs (objective) or symptoms (subjective) of sepsis including one or more of fever, mental confusion, diminished urine output, inadequate blood flow, thrombocytopenia, nausea and/or vomiting, abdominal guarding, rebound pain upon removal of pressure from the abdomen, silent abdomen, pain, redness of the skin, oliguria, coagulopathy, tachycardia, rigors, myalgia, productive cough, tachypnoea, sweats, dyspnea, cellulitis, borborygmus, loose stools, hemorrhagic colitis, pyelonephritis, pneumonia, obtundation, inflammation of the abdominal cavity lining, infection of the bile duct, intestinal infarction, petechiae, purpura, purpura fulminans, malaise, myalgia, arthralgia, headache, chills, rapid heart rate, and rapid breathing. In some embodiments, the treatment decreases hypotension. In some embodiments, the treatment decreases toxic shock associated with sepsis. In some embodiments, the treatment decreases coagulopathy.

In some embodiments, the combination of levocetirizine and montelukast is administered in a sequential manner. In some embodiments, the combination of levocetirizine and montelukast is administered in a substantially simultaneous manner.

In some embodiments, the combination is administered to the patient by one or more of the routes consisting of enteral, intravenous, intraperitoneal, inhalation, intramuscular, subcutaneous and oral. In some embodiments, the levocetirizine and montelukast are administered by the same route. In some embodiments, the levocetirizine and montelukast are administered via different routes. In some embodiments, one or more of levocetirizine or montelukast are provided as a slow release composition.

In some embodiments, the combination further comprises other medications known for use in treating sepsis and/or complications associated with sepsis. In some embodiments, the combination further comprises one or more antibiotics. In some embodiments, the combination further comprises a steroid.

Some embodiments pertain to a method of treating a patient having a septic shock, the method comprising administering to the patient an effective amount of a combination of levocetirizine and montelukast.

Some embodiments pertain to a composition for use in treating a patient having sepsis, the composition comprising a combination of levocetirizine and montelukast.

DETAILED DESCRIPTION

Figure 1A:
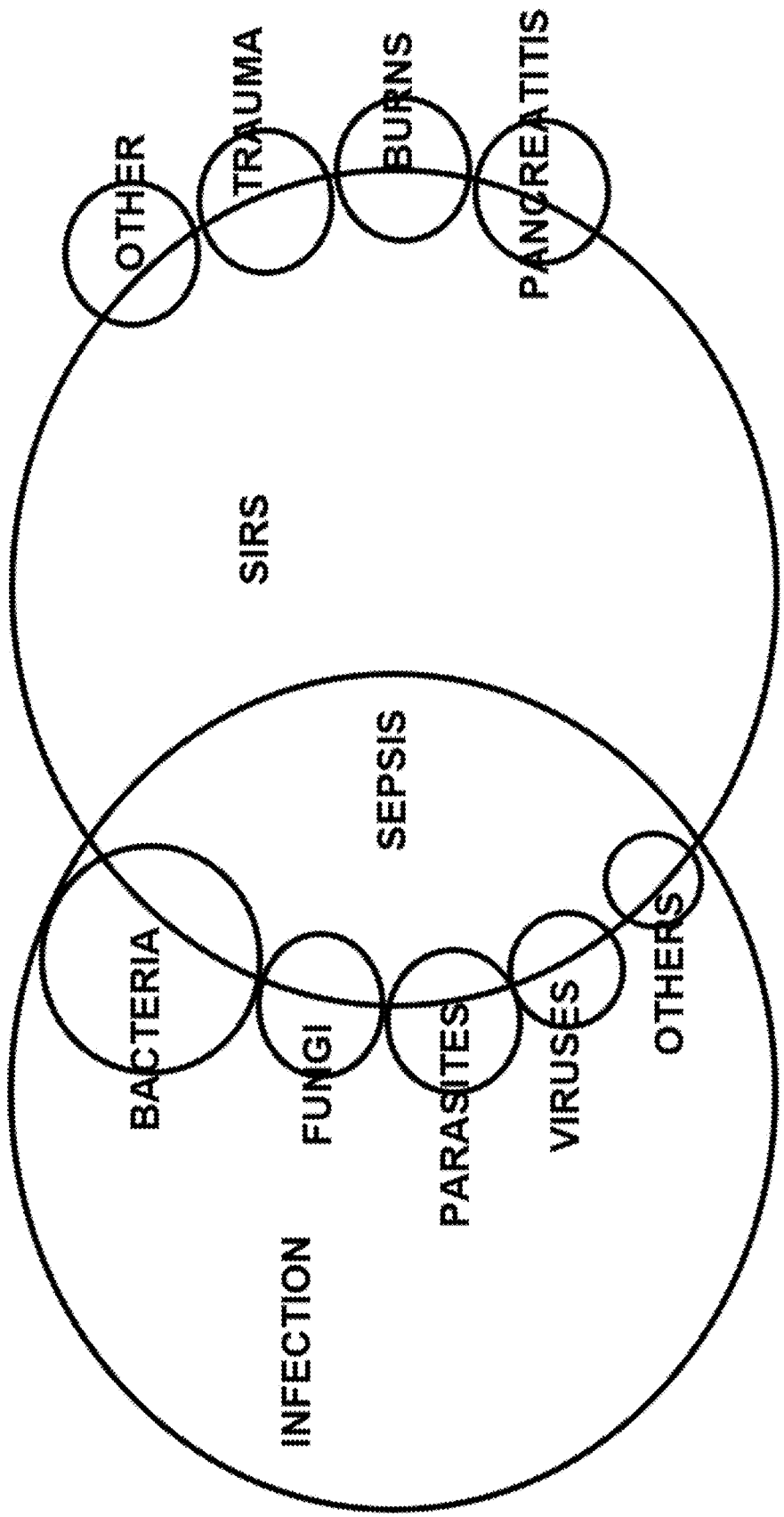
FIG. 1A shows a diagram of displaying a number of causes of sepsis, including infection caused by a number of sources (e.g., bacterial, fungal, parasitic, viral, others) and/or systemic inflammatory response (SIRS) caused by a number of sources (e.g., trauma, burns, pancreatitis, others). In several embodiments, a composition for use in treating a patient having sepsis from any one or more of these sources is provided, the composition comprising a combination of levocetirizine and montelukast.

Some examples described herein disclose the use of levocetirizine and montelukast as a medicament for the prevention or treatment of sepsis and/or complications of sepsis and/or damage caused by sepsis. In some embodiments, treatment candidates include patients who are at risk of or who are experiencing sepsis or an infection that could lead to sepsis. In some embodiments, sepsis caused by microbial or viral infection, including lung infection (e.g., pneumonia), appendicitis, infection of the abdomen, infection of the thin layer of tissue that lines the inside of the abdomen (e.g., peritonitis), infection of the bladder (cystitis), urethra, or kidneys (pyelonephritis), urinary tract infections, infection of the gallbladder (e.g., cholecystitis) or bile ducts (e.g., cholangitis), skin infection (e.g., cellulitis, which can be caused by an intravenous catheters inserted through the skin to give fluids or medication), infections from indwelling catheters or devices, infections following surgery, infections of the brain and nervous system (e.g., meningitis or encephalitis), flu, bone infection (osteomyelitis), and cardiac infection (endocarditis). The examples described herein are illustrative and not intended in any way to restrict the general inventions presented and the various aspects and features of these inventions. Furthermore, the phraseology and terminology used herein is for the purpose of description and should not be regarded as limiting. No features or steps disclosed herein are essential or indispensable.

As used herein, "treat," "treatment," "treating," "ameliorate," "amelioration," "ameliorating," "improvement," or "improving" refers to reducing, and/or alleviating the acute and/or long-term effects of a sepsis. Treatment may comprise one or more of slowing progression, shortening duration, alleviating and/or reducing symptoms (or complications), alleviating and/or reducing associated secondary conditions, decreasing the duration of symptoms, decreasing the duration of associated secondary conditions, and/or alleviating or decreasing long term or residual effects and/or associated secondary issues associated with sepsis. In some embodiments, "treating," (or "treatment") "ameliorating," (or "ameliorate") and/or "improving" (or "improvement") refers to a detectable improvement and/or a detectable change consistent with improvement that occurs in a subject or in at least a minority of subjects, e.g., in at least about: 2%, 5%, 10%, 15%, 20%, 25%, 30%, 40%, 50%, 60%, 70%, 75%, 80%, 85%, 90%, 95%, 98%, 100%, or ranges including and/or spanning the aforementioned values. In some embodiments, "treating," "ameliorating," and/or "improving" sepsis refers to lowering the severity of signs/symptoms associated with sepsis. In some embodiments, such improvement or change may be observed in treated subjects as compared to subjects not treated with levocetirizine and montelukast, where the untreated subjects have been exposed to the same source of infection, are suffering from the same or a similar severity of sepsis, or are subject to developing the same or similar disease condition, symptom, or the like. In some embodiments, treatment of a disease state (e.g., sepsis), condition, symptom or assay parameter may be determined subjectively or objectively, e.g., by in vitro assays, self-assessment by a subject(s), by a clinician's assessment or by conducting an appropriate assay or measurement, including, e.g., a quality of life assessment, a slowed progression of a disease(s) or condition(s), a reduced severity of a disease(s) or condition(s), or a suitable assay(s) for the level or activity(ies) of a biomolecule(s), cell(s), by detection of respiratory or inflammatory disorders in a subject, detection of fever, detection of degree of organ failure, detection of degree of tissue damage, and/or by modalities such as, but not limited to photographs, video, digital imaging, endoscopy, biopsy, and pulmonary function tests. Treatment may be transient, prolonged or permanent and/or it may be variable at relevant times during or after levocetirizine and montelukast are administered to a subject. Treatment with levocetirizine and montelukast may be evident from an assay (e.g., an in vitro assay, an in vivo assay, etc.). In some embodiments, the levocetirizine and montelukast treatment is curative. In some embodiments, the levocetirizine and montelukast combination successfully treats a patient when the combination is administered within timeframes described infra, or when administration occurs about 1 hour after, 1 day after, 1 week after, about 28 days after the subject(s) has first shown a sign or symptom of sepsis. In some embodiments, the levocetirizine and montelukast treatment is preventative. In some embodiments, the levocetirizine and montelukast combination successfully treats a patient when the combination is administered within timeframes described infra, or when microbial or viral exposure occurs about 1 hour after the administration or use of levocetirizine and montelukast to about 28 days, or 1, 3, 6, 9 months or more after a subject(s) has received such treatment (e.g., prophylactic use).

The "modulation" of, e.g., a symptom or condition, level or biological activity of a molecule, or the like, refers, for example, to the symptom or activity, or the like that is detectably increased or decreased. Such increase or decrease may be observed in treated subjects as compared to subjects not treated with levocetirizine and montelukast, where the untreated subjects have, or are subject to developing, the same or similar disease state, condition, symptom or the like. Such increases or decreases may be at least about 2%, 5%, 10%, 15%, 20%, 25%, 30%, 40%, 50%, 60%, 70%, 75%, 80%, 85%, 90%, 95%, 98%, 100%, 150%, 200%, 250%, 300%, 400%, 500%, 1000% or more or ranges including and/or spanning the aforementioned values. Modulation may be determined subjectively or objectively, e.g., by the subject's self-assessment, by a clinician's assessment or by conducting an appropriate assay or measurement, including, e.g., quality of life assessments, suitable assays for the level or activity of molecules, cells or cell migration within a subject and/or by modalities such as, but not limited to photographs, video, digital imaging, endoscopy, biopsy, and pulmonary function tests. Modulation may be transient, prolonged or permanent or it may be variable at relevant times during or after levocetirizine and montelukast are administered to a subject or is used in an assay or other method described herein or a cited reference, e.g., within times described infra, or about 1 hour after the administration or use of levocetirizine and montelukast to about 3, 6, 9 months or more after a subject(s) has received levocetirizine and montelukast.

As used herein, the terms "prevent," "preventing," and "prevention" refer to the prevention of onset or development of damage associated with or caused by sepsis and or microbial infection that is likely to result in sepsis. Preventing includes protecting against the occurrence and lowering the severity of damage associated with sepsis.

As used herein, the terms "complications associated with sepsis" include, but are not limited to, symptoms and secondary conditions associated with exposure to infection from microbes, viruses, prions, blood clotting, organ failure, and death.

Sepsis develops when a host response to an infection (e.g., generally by microbial or viral infection as from agents as disclosed elsewhere herein) becomes amplified and/or dysregulated. FIG. 1A provides a Venn diagram disclosing various causes of sepsis (each of which may be treated with the disclosed combination as provided elsewhere herein). The diagram shows the overlap of infection, bacteremia (e.g., blood born infection), sepsis, systemic inflammatory response syndrome, and multi-organ dysfunction. Sepsis is a systemic illness caused by microbial (e.g., bacterial, fungal, viral, etc.) invasion of normally sterile parts of the body. For example, sepsis can be caused when the physical barriers to host invasion formed externally by the skin and contiguous with it (internally the mucous membranes lining the gastrointestinal, genitourinary, and respiratory systems, as well as the mucous membrane of the eye), are altered (e.g., broken) and organisms (e.g., microbes) invade. Loss of integrity of the external barrier can be caused by, for example, indwelling urinary catheters, intravenous cannulas, an endotracheal tube, or trivial incursions (e.g., insect bites, thorn pricks, puncture wounds, or minor skin abrasions), or loss of integrity of the internal barrier in the gastrointestinal tract, which stretches from mouth to the anus and includes the hepatobiliary system.

Sepsis has multiple clinical phases: The treatment of patients with severe sepsis and septic shock is challenging, even in an ideal hospital setting. The occurrence of clinical findings is usually insidious, ranging in part to fever, altered mental status, temporary hypotension, decreasing urine output, or unexplained thrombocytopenia. If necessary actions are not taken or if sepsis remains untreated, respiratory and renal failure, coagulation disorders, and irremediable hypotension can develop. Sepsis can be divided into progressive clinical phases, including sepsis, severe sepsis, septic shock, and multiple organ dysfunction syndrome (MODS). Severe sepsis can directly induce myocardial depression with decreased contractility, impaired ventricular response to fluid therapy and ventricular dilatation as frequent findings. Septic myocardiopathy has also been reported. The incidence of in-hospital cardiac arrest is one to five events/1000 patient admissions, with a reported survival-to-discharge rate of 20% (0%-42%). The mortality rate varies between 70% and 90% when shock, disseminated intravascular coagulation (DIC), ARDS, and other organ failure complications develop. As disclosed elsewhere herein, the use of a combination as disclosed herein can improve these patient outcomes or others.

Role of bacterial toxins and proinflammatory cytokines in septic shock: In sepsis, bacterial products such as LPS from gram-negative bacteria, peptidoglycan and lipoteichoic acid from gram-positive bacteria, lipoarabinomannan from mycobacteria, fungal antigens, and prokaryotic DNA enter the circulation and initiate the immune response via the LPS binding protein, soluble CD14, membrane CD14, CD11/CD18 complex, and TLRs. The hemodynamic, metabolic, and immune changes seen in sepsis occur through mediators and cytokines that play a role in intercellular signal transmission. With the uncontrolled activation of the natural immune response in sepsis, the recognition of macrophages and endothelial and epithelial cells of bacterial products such as LPSs or non-methylated CpG DNA fragments with their specific receptors, results in the trigger of the cytokine cascade, e.g., the release of tumor necrosis factor-alpha (TNF)-α; interleukin (IL)-1, IL-6, IL-8, IL-12, and IL-18; and interferon (IFN)-γ (28). As a result, eliminating the effect of one cytokine is unlikely to mitigate the effects of numerous others involved in the process, i.e., may be a clinically ineffective in the treatment of such a heterogenous disruption of the molecular environment. As disclosed elsewhere herein, the use of a combination as disclosed herein can the body's immune response, addressing one or more of these dysregulated pathways.

Sepsis is a substantial socioeconomic burden: Infection leading to sepsis remains as one of the most serious unmet healthcare problems world-wide. It is estimated that 30 million people are affected each year and is responsible for an estimated 6 million deaths. In the United States alone, costs associated with sepsis can exceed $16 billion dollars, as most patients admitted to ICU require mechanical ventilation. As disclosed elsewhere herein, the use of a combination as disclosed herein can address this unmet need.

Some embodiments described herein provide a combination of levocetirizine and montelukast for the prevention, modulation, and/or treatment of complications, signs, symptoms, and/or other effects associated with sepsis, including sepsis originating from losses of integrity due to invasion through microbial and/or viral barriers as disclosed herein.

In some embodiments, levocetirizine and montelukast as disclosed herein are used to treat the signs and/or symptoms caused by sepsis involving microbial and/or viral infection. In some embodiments, levocetirizine and montelukast as disclosed herein are used to treat signs and/or symptoms originating from sepsis. In some embodiments, the treated signs or symptoms of sepsis include one or more of fever, mental confusion, hypotension (including transient), diminished urine output, inadequate blood flow, thrombocytopenia, pain, nausea, vomiting, guarding, rebound, silent abdomen, pain (e.g., abdomen, loin, head, chest, etc.), redness of the skin, oliguria, coagulopathy, tachycardia, rigors, myalgia, productive cough, tachypnea, sweats, dyspnea, cellulitis (e.g., with fever, localized pain, and redness), toxic shock (e.g., with hypotension, oliguria, altered mental status, and coagulopathy), borborygmus, loose stools, hemorrhagic colitis (e.g., with fever), abdominal discomfort, pyelonephritis (e.g., with fever, tachycardia, hypotension, loin pain), lobar pneumonia (e.g., with high fever, rigors, myalgia, productive cough, tachypnea, tachycardia, and hypotension), pneumonia (e.g., with fever, sweats, dyspnea, and pleuritic chest pain), obtundation, inflammation of the abdominal cavity lining, infection of the bile duct, intestinal infarction, petechiae, purpura, purpura fulminans, confusion, "off legs", malaise, myalgia, arthralgia, headache, chills, rapid heart rate, rapid breathing, and/or septic shock (hypotension despite fluid resuscitation plus hypoperfusion).

In some embodiments, the one or more of the treated signs or symptoms of sepsis are those not unique to sepsis and/or can also be caused by other diseases that are neither microbial or viral in nature (e.g., pancreatitis). In some embodiments, as disclosed herein, the combination of levocetirizine and montelukast is used specifically to treat signs or symptoms caused by sepsis involving a microbial and/or viral infection. In some embodiments, the combination of levocetirizine and montelukast as disclosed herein is not used to treat the signs and/or symptoms associated with non-microbial or viral origins, even where those signs and/or symptoms overlap with those associated with sepsis. Some embodiments, for example, include a step of selecting a patient to be treated that is suffering from sepsis or is at risk for sepsis. In some embodiments, the method of treating sepsis, one or more signs and/or symptoms and/or complications thereof, includes the administration of levocetirizine and montelukast in an effective amount to a patient in need of treatment.

In some embodiments, as disclosed elsewhere herein, the signs and/or symptoms that are treated are microbial or fungal in nature. In some embodiments, the sepsis and/or symptoms thereof that are treated are as a result of bacterial infection. In some embodiments, the bacterial infection comprises infection from a gram-negative bacteria. In some embodiments, the bacterial infection comprises infection from a gram-positive bacteria. In some embodiments, the bacterial infection comprises infection from bacteria, or from multiple strains of bacteria, selected from *Staphylococcus, Staphylococcus aureus, Staphylococcus epidermidis, Streptococcus, Streptococcus pyogenes, Escherichia coli, Pseudomonas aeruginosa, Klebsiella, Fusobacterium necrophorum, Enterococcus, Meningococcus, Bacteroides, Salmonella, Shigella*, and *Serratia*. In some embodiments, the sepsis infection comprises infection from a fungi. In some embodiments, the origin of the fungal sepsis is *candida* (yeast).

In some embodiments, the bacterial infection comprises infection from bacteria, or from multiple strains of bacteria, presenting one or more endotoxins, exotoxins, and/or antigenic moieties. In some embodiments, the bacterial infection comprises infection from bacteria, or from multiple strains of bacteria, presenting one or more endotoxins, exotoxins, and/or antigenic moieties selected from the group consisting of lipopolysaccharide (LPS), peptidoglycan, lipoteichoic acid, one or more toxic shock syndrome toxins (e.g., toxic shock syndrome toxin-1 (TTST-1), etc.), pyrogenic exotoxins. In some embodiments, the bacterial infection comprises infection from a bacteria presenting a superantigen (e.g., staphylococcal endotoxins, streptococcal endotoxins, etc.). In some embodiments, the bacterial infection comprises infection from a streptococcal bacteria presenting streptococcal pyrogenic exotoxin A (SPEA), and streptococcal mitogenic exotoxin Z (SMEZ). In some embodiments, the bacterial infection comprises infection from bacteria, or from multiple strains of bacteria, presenting one or more flagellin, curli, and unmethylated CpG sequences in naked bacterial DNA. In some embodiments, the combination of levocetirizine and montelukast can interfere with the immunological cascade activated by one or more of these endotoxins, exotoxins, or antigenic moieties.

Sepsis exists in a continuum of severity from: (a) sepsis (bacteremia) to (b) severe sepsis (sepsis plus organ dysfunction, hypotension, or hypoperfusion including but not limited to lactic acidosis, oliguria, or acute mental status changes), and (c) septic shock (hypotension despite fluid resuscitation plus hypoperfusion) ultimately leading to (d) multiple organ dysfunction syndrome (MODS) and death. In several embodiments, levocetirizine and montelukast can be used to treat sepsis at any one of these stages. Sepsis includes one or more parameters of inflammation and evidence or suspicion of a microbial or viral process: Core temperature >38.3° C. or <36° C., heart rate >90/min (or >2 SD above normal for age), tachypnoea, altered mental status, significant edema or positive fluid balance (>20 ml/kg in 24 hours), blood glucose >7.7 mmol/l in absence of diabetes, plasma C reactive protein >2 SD above limit of reference interval, plasma procalcitonin >2 SD above limit of reference interval, white cell count >12×10$^9$ cells/l or <4×10$^9$ cells/l, or fall in SBP>40 mm Hg in adults, mixed venous hemoglobin oxygen saturation >70%, Cardiac index>3.5 l/min/m$^2$, arterial hypoxemia (Pao$_2$/Flo$_2$<40 kPa), acute oliguria (urine output <0.5 ml/kg/hr), creatinine increase >44.2 μmol/l, INR>1.5 or aPTT>60 s, ileus, platelet count <100×10$^9$/l, plasma bilirubin >70 mmol/l, lactate >1 mmol/l, decreased capillary refill or mottling. Severe sepsis includes one or more of sepsis plus organ dysfunction, hypotension, or hypoperfusion including but not limited to lactic acidosis, oliguria, or acute mental status changes. Septic shock includes one or more of sepsis plus hypotension despite adequate volume resuscitation plus hypoperfusion. In several embodiments, levocetirizine and montelukast can be used to treat sepsis with any one or more of these additional disorders related to sepsis. In some embodiments, the combination of levocetirizine and montelukast treat one or more of sepsis, severe sepsis, septic shock, and multiple organ dysfunction syndrome.

Figure 1B:
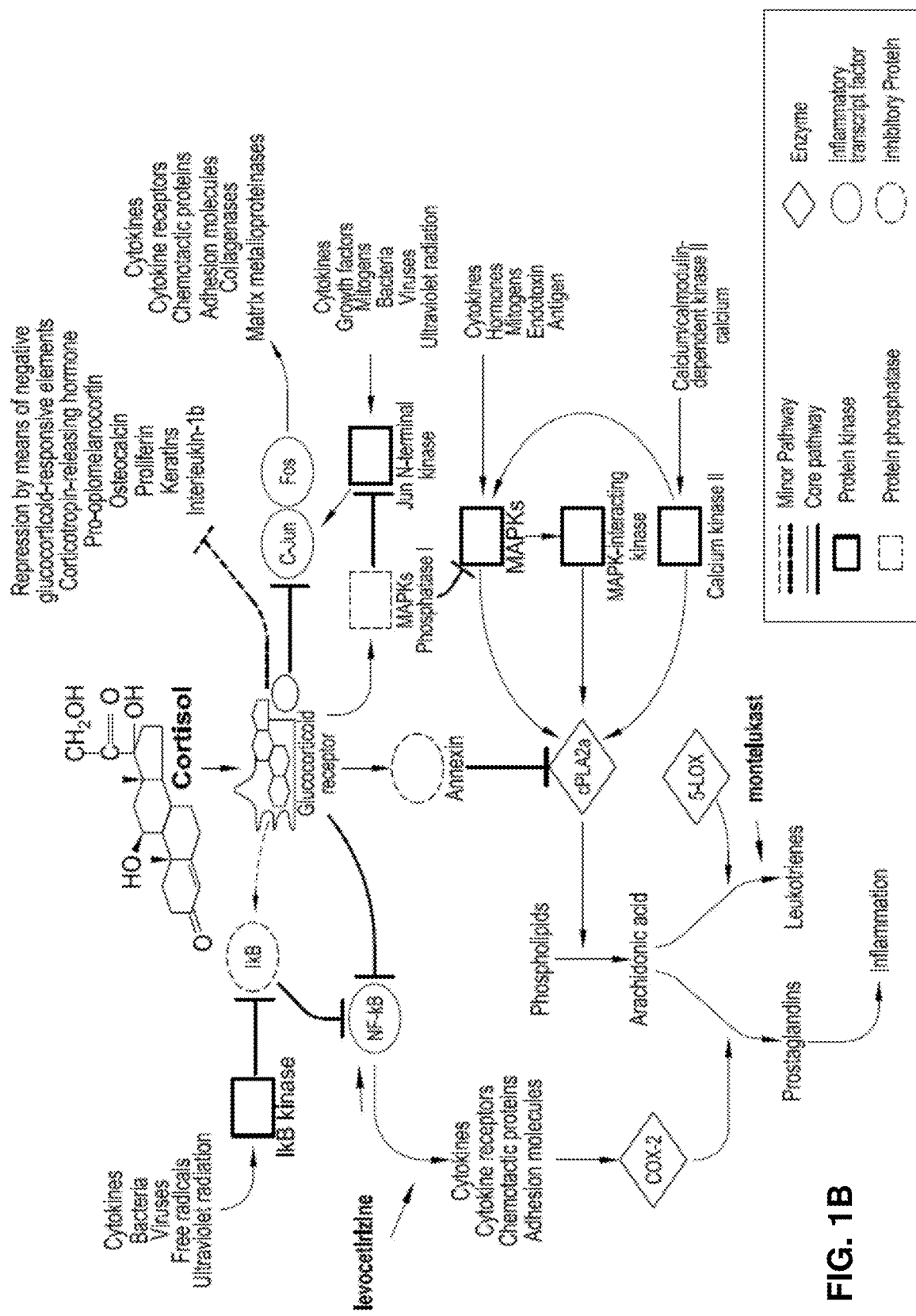
FIG. 1B shows a diagram of a proposed anti-inflammatory mechanism of action of levocetirizine and montelukast utilizing a steroid model pathway.

FIG. 1B shows a diagram of a proposed anti-inflammatory mechanism of action of levocetirizine and montelukast utilizing a steroid model pathway. Without being bound to a particular mechanism, it is believed that levocetirizine and montelukast function in part through this mechanism. As shown, levocetirizine and montelukast may interact with and/or interfere with various biological cascades, including affecting different cascades (e.g., those involving NF-κB and/or leukotriene activation, respectively) in parallel to achieve their therapeutic effect. In some embodiments, as shown, levocetirizine and montelukast interrupt or interfere with one or more cascades involving one or more of cortisol, IκB kinase, IκB, COX-2, C-Jun Fos, MAPKs phosphatase I, Jun N-terminal kinase, MAPKs, MAPK-interacting kinase, calcium kinase II, calcium/calmodulin dependent kinase II, cPLA2a, 5-LOX, and the like.

Figure 2:
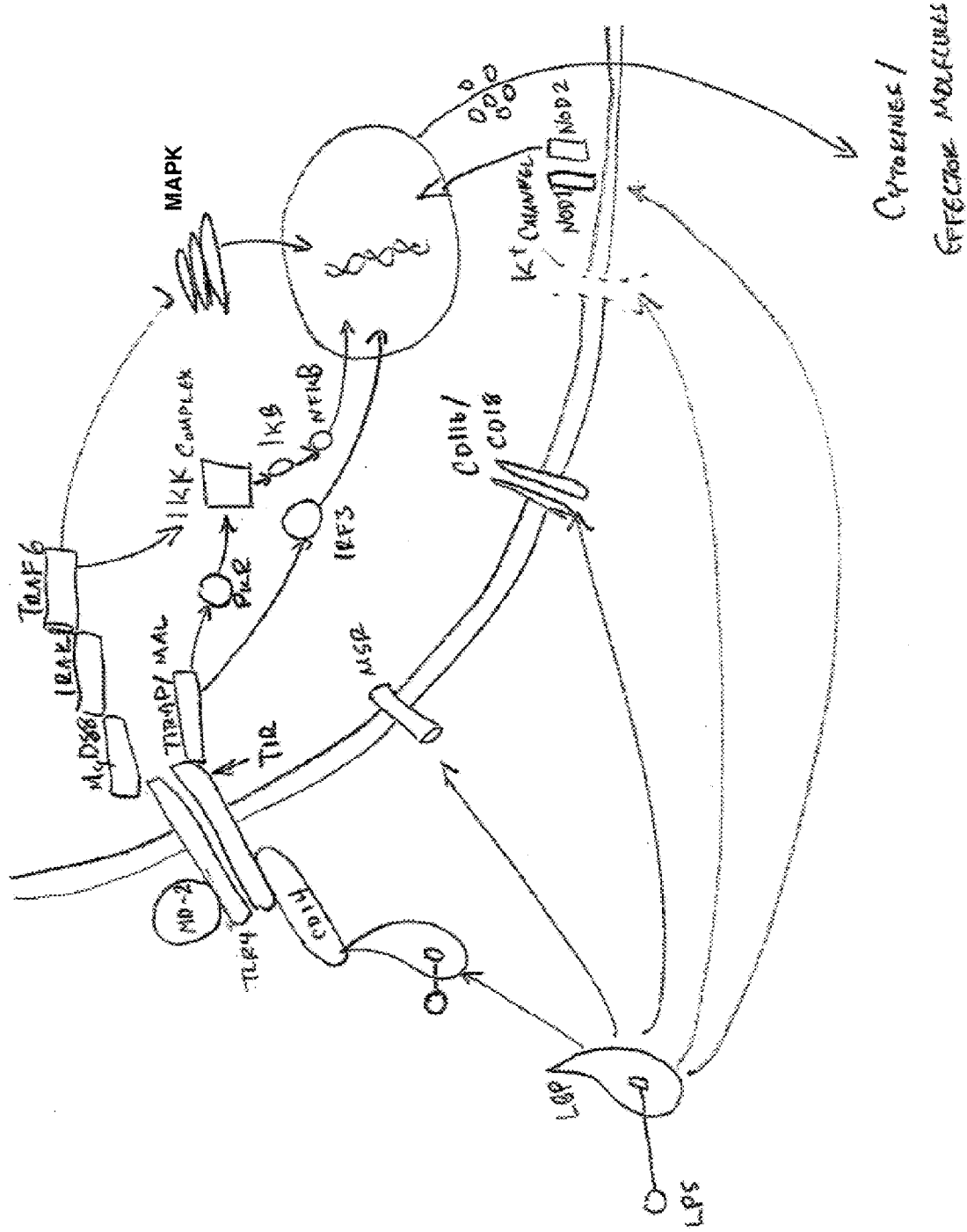
FIG. 2 is a diagram depicting a cell and embodiments of biological cascades involved in sepsis.

In some embodiments, the combination of levocetirizine and montelukast can interfere with and/or attenuate the innate immune response thereby treating sepsis. In some embodiments, the combination of levocetirizine and montelukast can interfere with sepsis pathways through one or more of toll-like receptors (TLRs, including but not limited to, one or more of TLR-1, TLR-2, TLR-3, TLR-4, TLR-5, TLR-6, TLR-7, TLR-8, TLR-9, and/or TLR-10), LPS-binding protein (LBP), the op sonic receptors (e.g., CD14), and/or monocytic intracellular proteins (e.g., NOD1, NOD2, etc.). As shown in FIG. 2, LPS (the major component of the outer membrane of gram-negative bacteria) can be sensed via an LPS-binding protein (LBP)—LPS complex. In some embodiments, the combination of levocetirizine and montelukast can interfere with any of the signaling pathways shown, including those involving toll-like receptor 4 (TLR4)-MD-2 complex, the macrophage scavenger receptor (MSR), CD1 lb/CD18, and ion channels. In some embodiments, the combination of levocetirizine and montelukast can interfere with intracellular signaling that relies on binding intracellular TLR domain, TIR (Toll/IL-1 receptor homology domain), IRAK (IL-1 receptor-associated kinase), MyD88 (myeloid differentiation protein 88), TIRAP (TIR domain containing adapter protein, Tollip (Toll-interacting protein). In some embodiments, the combination of levocetirizine and montelukast can interfere with MyD88-independent pathways including those involving TIRAP/Mal signals through an RNA-dependent protein kinase (PKR) and interferon regulatory factor (IRF)-3. Intracellular receptors called NOD proteins (nucleotide-binding oligomerization domain) may also be involved in the mechanism. NOD1 may participate as an APAF-1-like activator of Caspase-9 (an enzyme critical to the apoptotic pathway) and Nf-kB. In some embodiments, expression of NOD1 and NOD2 confer responsiveness to Gram-negative LPS.

In some embodiments, the combination of levocetirizine and montelukast can down regulate the production of interferon-γ (IFN-γ) from toxin-activated T cells. In some embodiments, the combination of levocetirizine and montelukast can interfere with the activation of the intracellular protein complex NF-κB (nuclear factor kappa B) which is in turn responsible for the reduction of I-CAM-1. I-CAM-1, a transmembrane protein, is viewed as the portal of entry of human rhinovirus into the cell. In some embodiments, the combination of levocetirizine and montelukast decreases eosinophil and neutrophil quantity and migration and/or inflammatory mediators/cytokines/adhesion molecules: IL-lb, TNF-α, NF-kB, IL-4, IL-6, IL-7, IL-8, IL-12, IL-15, IL-18, RANTES, GM-CSF, TLR-3, AP-1, ICAM-1, and V-CAM-1. TNF-α (a potent signaling protein produced by macrophages/monocytes during acute inflammation), regulates in part, one or more symptoms of sepsis (e.g., fever and other bodily responses to infectious exposure). TNF-α and IL-1 are cytokines that mediate many of the immunopathological features of LPS-induced shock which are released during the first 30-90 minutes after exposure to LPS. These cytokines activate a second level of inflammatory cascades including cytokines, lipid mediators and reactive oxygen species, as well as upregulating cell adhesion molecules that result in the initiation of inflammatory cell migration into tissues.

In some embodiments, the combination of levocetirizine and montelukast can interfere with the expression or activity of high mobility group B1 (HMGB1), and macrophage inhibitory factor (MIF). In some embodiments, patients with sepsis have elevated serum levels of HMGB1, and that higher levels are associated with an increased mortality. MIF may mediate shock caused by Gram-positive bacteria, such as the toxic shock syndrome associated with S. aureus, suggesting that anti-MIF strategies might have broad application in septic patients. In some embodiments, clinical intervention in sepsis patients is achieved by blocking or neutralizing cascades involving HMGB1 and/or MIF through the use and/or administration of levocetirizine and montelukast. In some embodiments, interference with pro-inflammatory cytokines (e.g., MIF and HMGB1) are important because they are responsible for orchestrating a complex network of secondary responses. For instance, IL-18 is a cytokine that induces production of interferon-γ (IFN-γ). In mononuclear cells, IFN-γ can upregulate surface expression of TLR4, MD-2 and MyD88, and counteracts the LPS-induced downregulation of TLR4.

Figure 3:
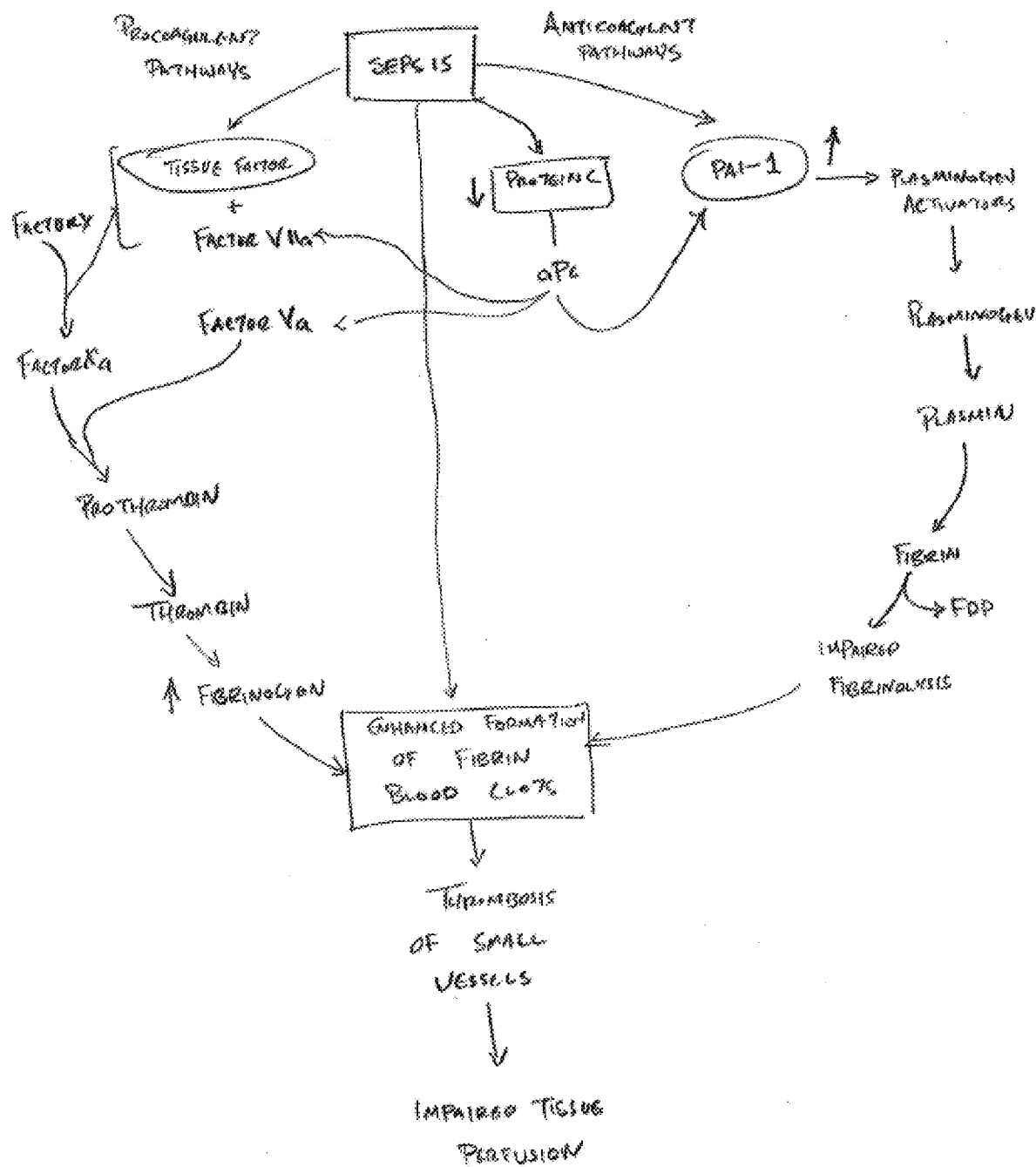
FIG. 3 is a diagram depicting embodiments of procoagulant and anticoagulant pathways that may be affected during sepsis. In several embodiments, levocetirizine and montelukast block the activity of one or more of factors (as indicated in FIG. 3) within the procoagulant or anticoagulant pathways, as shown in FIG. 3.
Figure 4:
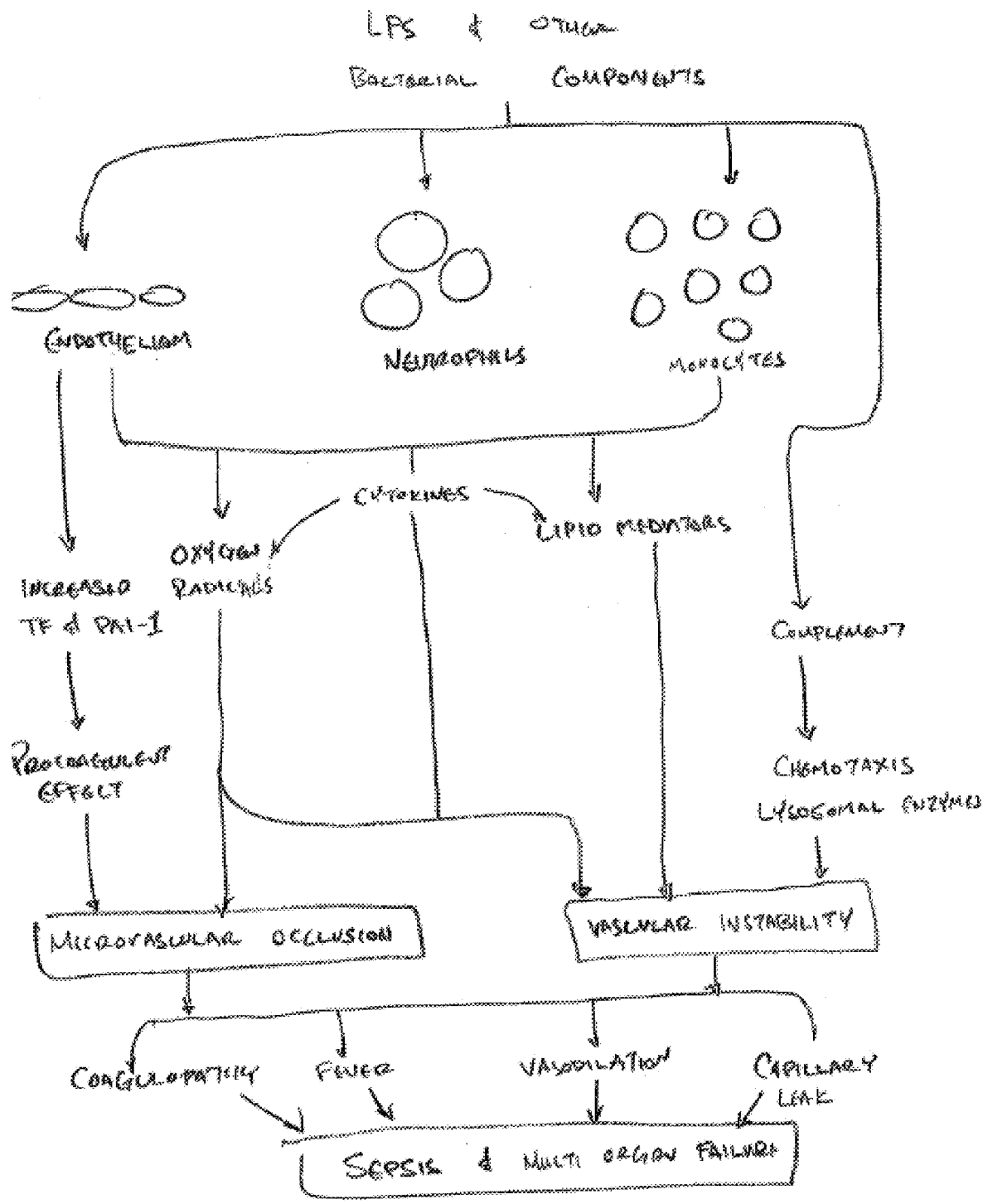
FIG. 4 is a diagram depicting possible pathophysiologic pathways leading to septic shock and organ failure. In several embodiments, levocetirizine and montelukast block the activity of one or more of steps (as indicated in FIG. 4) within these pathways.

FIG. 3 is a diagram of the pathway associated with the procoagulant effect accompanying sepsis. For instance, as shown, sepsis disturbs the normal homeostatic balance between procoagulant and anticoagulant mechanisms through an increased production of prothrombin that is converted to thrombin, which in turn generates fibrin from fibrinogen. Concurrently, levels of the plasminogen-activator inhibitor-1 (PAI-1) are increased, resulting in an impaired production of plasmin and thus failure of fibrinolytic mechanisms by which fibrin is converted to degradation products (FDP). Sepsis also causes a decrease in the levels of the natural anticoagulant protein C (and also antithrombin and the tissue factor pathway inhibitor, TFPI, not shown). The activated form of protein C (shown as aPC), dissociates from the endothelial protein C receptor to inactivate factors Va and VIIa and inhibit PAI-1 activity; hence reduced levels of protein C result in an enhanced procoagulant effect. The net result is the increased formation of fibrin clots in the microvasculature, leading to impaired tissue oxygenation and cell damage. In some embodiments, the combination of levocetirizine and montelukast can interfere with enhanced coagulation that leads, in part to organ failure (e.g., multi-organ failure). In some embodiments, the combination of levocetirizine and montelukast can block one or more of the pathways shown in FIG. 3 through interference with any one or more cytokines, adhesion molecules, and/or factors as disclosed in FIG. 3 (e.g., protein C, PAI-1, aPC, plasmogen activators, plasmogen, fibrin, FDP, fibrinolysis enzymes, Factor X, Factor Xa, Factor Va, Factor VIIa, tissue factor, prothrombin, thrombin, fibrinogen, etc.). In some embodiments, the combination of levocetirizine and montelukast can block one or more of the biological pathways associated with septic shock through interference with any one or more cytokines, adhesion molecules, and/or factors as disclosed in FIG. 4 (e.g., cytokines, oxygen radicals, TF, PAI-1, procoagulant, lipid mediators, chemotaxis lysosomal enzymes, etc.).

As disclosed elsewhere herein, exemplary chemokines, cytokines, and biomarkers that may be involved in the treatment of sepsis that, in some embodiments, are downregulated or upregulated through the administration of levocetirizine and montelukast include but are not limited to: Granulocyte macrophage colony stimulating factor (GM-CSF); GROα; Interferon α2 (IFNα2); IFNβ; IFNγ; IL-10; Interleukin 12p70 (IL-12p70); IL12p40; Interleukin 1α (IL-1α); IL-1β; IL-1 receptor antagonist (IL-1RA); IL-2; IL-4; IL-5; IL-6; IL-8; IFN-γ-inducible protein 10 (IP-10); Monocyte chemoattractant protein 1, -2, or -3 (MCP-1, MCP-2, MCP-3); Monocyte chemoattractant protein 3 (MCP-3); Macrophage colony stimulating factor (MCSF); MIP-α; MIP-1β; Soluble CD40 ligand (sCD40L); Soluble E-selectin (sE-selectin); Soluble Fas ligand (sFasL); Tumor necrosis factor α and β (TNF-α and/or TNF-β); Vascular endothelial growth factor A (VEGF-A); D-dimer; Tissue plasminogen activator (TPA); Plasminogen activator inhibitor-1 (PAI-1); Serum amyloid antigen (SAA); Regulated on activation, normal T-cell expressed and secreted (RANTES); sVCAM-1; Fibrinogen; Ferritin; Cortisol; Tissue factor (TF); Thrombomodulin; S 100B protein; Cellular prion protein ($PrP^C$); Ubiquitin C-terminal hydrolase-L1 (UCH-L1); choline (cell membrane damage); Myo-inositol (cell membrane damage or reactive astrogliosis); Tau protein; p-Tau (phosphorylated Tau); ICAM-1 (Intercellular adhesion molecule 1); ICAM-5 (Intercellular adhesion molecule 5); GFAP (Glial fibrillary acidic protein); NRGN (Neurogranin); SNCB (Beta-Synuclein); MT3 (Metallothionein 3); and injury specific exosomes/microRNA and NF-kB.

In some embodiments, the combination of levocetirizine and montelukast modulates, treats, or prevents threshold effects of sepsis. In some embodiments, the combination of levocetirizine and montelukast modulates, treats, or prevents one or more of the signs, symptoms, and secondary conditions associated with sepsis. For instance, in some embodiments, the combination of levocetirizine and montelukast modulates, treats, or prevents one or more of pain, nausea, vomiting, cramps, diarrhea, dehydration, electrolyte imbalance, fever, nervousness, confusion, headache, seizures, loss of consciousness, coma, altered cell signaling/trafficking, alterations in cellular differentiation and function, damage to immune/metabolic pathways, and vascular injury. In some embodiments, the combination of levocetirizine and montelukast reduces the risk and/or lessens the likelihood of a patient dying from sepsis.

In some embodiments, the combination of levocetirizine and montelukast modulates, treats, or prevents sepsis damage, signs, symptoms, and/or associated secondary conditions wherein the damage, sign, symptoms, and/or associated secondary conditions are inflammation-mediated. In some embodiments, the combination of levocetirizine and montelukast modulates, treats, or prevents sepsis, signs, symptoms, and/or associated secondary conditions that are not skin conditions. In some embodiments, the combination of levocetirizine and montelukast modulates, treats, or prevents sepsis, signs, symptoms, and/or associated secondary conditions that are not inflammatory skin conditions. In some embodiments, the combination of levocetirizine and montelukast modulates, treats, or prevents sepsis, signs, symptoms, and/or associated secondary conditions that are not edema or erythema. In some embodiments, the combination of levocetirizine and montelukast modulates, treats, or prevents sepsis, signs, symptoms, and/or associated secondary conditions that are not IgE mediated. In some embodiments, the combination of levocetirizine and montelukast modulates, treats, or prevents inflammation-caused damage, signs, symptoms, and/or associated secondary conditions wherein the inflammation is caused specifically by sepsis (and not other sources of inflammation). In some embodiments, the combination of levocetirizine and montelukast modulates, treats, or prevents one or more of damage, signs, symptoms, and/or associated secondary conditions associated with sepsis that are not symptoms of allergy, cold, flu, or radiation exposure.

In some embodiments, the combination of levocetirizine and montelukast further comprises a steroid. In some embodiments, the combination of levocetirizine and montelukast does not include a steroid. In some embodiments, the combination of levocetirizine and montelukast does not include a corticotropin releasing factor (CRF). In some embodiments, the combination of levocetirizine and montelukast modulates, treats, or prevents sepsis damage, signs, symptoms, and/or associated secondary conditions wherein the damage, signs, symptoms, and/or associated secondary conditions are not associated with physical impact. For example, physical impact can include a crushing or penetrating injury such as from bodily injury sustained during a car accident, from a gunshot (e.g., a bullet penetrating tissue), or stab wound. In some embodiments, the combination of levocetirizine and montelukast modulates, treats, or prevents sepsis, signs, symptoms, and/or associated secondary conditions wherein the damage, signs, symptoms, and/or associated secondary conditions are not associated with traumatic injury, vasculitis, autoimmune disease, radiation, or neurological disorders. In some embodiments, the combination of levocetirizine and montelukast modulates, treats, or prevents sepsis, signs, symptoms, and/or associated secondary conditions wherein the damage, signs, symptoms, and/or associated secondary conditions are not associated with blood vessel disruption, occlusion, or rupture associated with stroke, embolism, aneurysm, etc.

Without being bound to any particular mechanism, as disclosed elsewhere herein, it is believed that, in some embodiments, the combination of levocetirizine and montelukast treats patients with complications associated with sepsis by virtue of the combination's ability to reduce inflammatory responses and or interrupt biological cascades associated with sepsis, thereby improving patients' clinical outcomes. The use of a combination of levocetirizine and montelukast targets multiple inflammatory pathways in the body, to decrease inflammation and allow treatment of sepsis or alleviating complications associated with sepsis. In some embodiments, the combination of levocetirizine and montelukast have a synergistic effect in the treatment of sepsis. As described herein, in some embodiments, synergy between levocetirizine and montelukast shortens the course of sepsis-related acute disease processes, thereby decreasing morbidity and mortality. In some embodiments, this combined therapy also can improve quality of life by the amelioration of the signs/symptoms/secondary conditions/side effects/and the disease process itself, thereby decreasing health-care costs.

Without being bound to any particular mechanism, it is believed that, in some embodiments, the combination of levocetirizine and montelukast treats patients with complications associated with sepsis by virtue of certain antioxidative properties of the combination.

Levocetirizine is an antihistamine and montelukast is a leukotriene receptor antagonist. Levocetirizine, as a potent H1-antihistamine, acts in part by down-regulating the H1 receptor on the surface of mast cells and basophils to block the IgE-mediated release of histamine—the agent responsible for the cardinal symptoms of the innate immune response, including an inflammatory response, fever, sneezing, rhinorrhea, nasal congestion, itchy palate, and itchy red and watery eyes. Levocetirizine offers a short time to peak plasma level, hr., a short time to steady state level, 40 hours, a low volume of distribution, 0.4 L/kg, and an enhanced receptor affinity of 5× over first generation mepyramine in an acidic pH (many acute inflammatory disease states are associated with acidosis, a low physiologic pH; increased Levocetirizine has a 24-hour receptor occupancy of ~75%, the highest of the commercially available antihistamines. Receptor occupancy of the second generation antihistamines appears to correlate with the pharmacodynamic activity in skin wheal and flare studies and with efficacy in allergen challenge chamber studies. Levocetirizine is approved in the US for the treatment of perennial allergic rhinitis and chronic idiopathic urticaria down to six months of age. Levocetirizine is the most potent of the five modern generation antihistamines through histamine induced wheal and flare data. For example, levocetirizine at 5 mg per day is more effective than fexofenadine at its commonly prescribed dose of 180 mg per day in the United States. In Europe the adult dose of fexofenadine is 120 mg per day.

Montelukast, a leukotriene receptor antagonist, acts by binding with high affinity and selectivity to the CysLT1 receptor to inhibit the physiologic actions of the leukotriene LTD4. Leukotrienes are fatty signaling molecules whose effects include airway edema, smooth muscle contraction and altered cellular activity associated with the inflammatory process. Overproduction of leukotriene is a major cause of inflammation. The cysteinyl leukotrienes (LTC4, LTD4, LDE4) are products of arachidonic acid metabolism. These leukotrienes are released from various cells including mast cells and eosinophils. They bind to receptors in the human airway and on other pro-inflammatory cells including eosinophils and certain myeloid stem cells. Without being bound to any particular theory, it is thought that overproduction of leukotrienes contributes to inflammation associated with sepsis.

Montelukast is FDA approved in the US for the treatment of perennial allergic rhinitis, asthma, seasonal allergic rhinitis, and exercised induced bronchospasm. Montelukast is ineffective in improving asthma control or cold symptom scores caused by experimental rhinovirus infection. Analysis of secondary outcomes suggests that montelukast may protect against reductions in lung function and increases in sputum eosinophils caused by infections. During the recovery phase the percentage of sputum eosinophils was elevated in the placebo group, while the montelukast group remained at baseline levels. Further, peak expiratory flow was not decreased in the montelukast-treated patients. Montelukast treatment has no effect on the respiratory symptoms of patients with acute respiratory syncitial virus bronchiolitis.

Montelukast reaches a steady state level, like the second generation antihistamine, levocetirizine, in less than two days. Unlike other currently available leukotriene modulators, zileuton and zafirlukast, routine monitoring of liver function tests is not required. There are no drug interactions with warfarin, theophylline, digoxin, terfenadine, oral contraceptives, or prednisone.

Levocetirizine and montelukast are associated with millions of days of patient use; FDA approved in the United States for allergic disorders down to age six months. The combination of levocetirizine and montelukast can be given primarily or in conjunction with many of the existing therapeutic protocols for the treatment of complications associated with sepsis. In some embodiments, the combination of levocetirizine and montelukast can be administered for the treatment of sepsis or preventatively in patients, including pregnant women (both Pregnancy Category B) and children, that are under the age of about 1, about 2, about 3, about 4, about 5, about 10, about 15, or about 18. Moreover, both drugs have only once daily dosing, and no routine monitoring of blood work is necessary for most clinical situations. Further, both drugs exhibit minimal clinically relevant interactions with other medications. As described herein, both levocetirizine and montelukast reach steady state levels within two days to rapidly produce a synergistic and complementary anti-inflammatory effect.

Levocetirizine and montelukast are in different drug classes and target different receptors in the body. As disclosed elsewhere herein, they target different receptors in the body; levocetirizine and montelukast achieve their effect via different molecular pathways. In some embodiments, the combination of montelukast and levocetirizine achieves a unique synergy to treat and/or provide a protective effect against sepsis, either prior to, during, or following bacterial, fungal, and/or viral exposure. In some embodiments, the synergistic effect shortens the course of complications caused by sepsis and issues precipitated by sepsis. In some embodiments, this synergistic effect is accomplished by the combination of levocetirizine and montelukast by targeting their respective different pathways in the body. In some embodiments, multiple inflammatory signaling pathways in the body are targeted to achieve protective effects or the treatment of sepsis-based complications using levocetirizine and montelukast. In some embodiments, synergy is achieved by downregulating certain inflammatory processes. In some embodiments, the combination's effect to alleviate one or more disease states or symptoms associated with sepsis exposure is achieved by stabilizing or reducing oxidative stress or physiological effects of oxidative stress caused by sepsis. In some embodiments, synergy is achieved by enhancing certain antioxidant effects of the combination. In some embodiments, the use of the combination of montelukast and levocetirizine decreases one or more of the symptoms of, the duration of, morbidity from, and mortality from sepsis-related disease states and symptoms. In some embodiments, the combination of levocetirizine and montelukast decreases the progression of complications associated with sepsis. In some embodiments, the combined levocetirizine and montelukast therapy can improve quality of life by ameliorating one or more of the symptoms, side effects, and the underlying sepsis damage or complication itself, resulting in decreased health-care costs. In some embodiments, a synergistic effect can be observed in the use of a combination of levocetirizine and montelukast to treat inflammation.

In some embodiments, levocetirizine and montelukast can be used in combination with other treatments for sepsis, including one or more antibiotics, vasopressors, corticosteroids, insulin, immune stimulants, painkillers, and sedatives. In some embodiments, levocetirizine and montelukast can be used in combination with broad spectrum antibiotics including one or more of tetracycline, ciprofloxacin, levofloxacin, penicillin, cephalexin, meropenem, imipenem, piperacillin-tazobactam, tigecycline, metronidazole, aztreonam, cefepime, azithromycin, vancomycin, ceftriaxone, clindamycin, trimethoprim/sulfamethoxazole, doxycycline, linezolid, gentamycin, amikacin, tobramycin, or combinations thereof.

Without being bound to any particular theory, it is believed that unchecked, pro-inflammatory reactions in the body can exacerbate biological effects and issues caused by sepsis. In some instances, these inflammatory responses contribute to the development and progression of complications associated with sepsis exposure. In other instances, these inflammatory responses are themselves responsible for certain symptoms related to sepsis. In some embodiments, levocetirizine and montelukast act by down regulating pro-inflammatory mediators elicited by evolving sepsis, allowing the body to more readily react and recover from sepsis and complications associated with sepsis. In some embodiments, the levocetirizine and montelukast directly improve and/or resolve issues, signs, or symptoms caused by sepsis. Some embodiments provide the combination of levocetirizine and montelukast as a medicament for the treatment of complications associated with sepsis that are exacerbated by or result from innate immune responses or adaptive immune responses caused by sepsis.

Without being bound to any particular theory, the anti-inflammatory effect of the combination of levocetirizine and montelukast is due, at least in part, to the fact that both levocetirizine and montelukast affect eosinophil migration/quantity; the eosinophil is considered by scientists/clinicians as one hallmark of inflammation. Additionally, as discussed elsewhere herein, the response may be related, at least in part, due to levocetirizine's interference with the toll-like receptors (TLRs) and montelukast's separate interference with the leukotriene-related pathways to inflammation.

A common feature of all TLR recognition is the activation of three major signaling pathways: nuclear factor kappa-B (NF-κB), mitogen-activated protein kinase (MAPKs), and one or more of the interferon regulatory factors (IRFs). In some embodiments, the combination of levocetirizine and montelukast is used in methods to treat complications associated with sepsis by blocking activation of one or more of these pathways. NF-κB plays a pivotal role across a spectrum of inflammation, immunity, cell proliferation, differentiation, cell survival, and cell death. NF-κB is expressed in almost all cell types and tissues. Specific binding sites are present in the promoters/enhancers of a large number of genes. For example, NF-κB target genes include: Cytokines/Chemokines and their Modulators, Immunoreceptors, Proteins Involved in Antigen Presentation, Cell Adhesion Molecules, Acute Phase Proteins, Stress Response Genes, Cell Surface Receptors, Regulators of Apoptosis, Growth Factors, Ligands and their Modulators, Early Response Genes, Transcription Factors and Regulators, Viruses, and Enzymes.

In some embodiments, the combination of levocetirizine and montelukast is used in methods to treat complications associated with sepsis that elicit cellular activity or inflammatory responses via NF-κB. In some embodiments, the combination of levocetirizine and montelukast treats complications associated with sepsis by blocking activation through the NF-κB pathway. In some embodiments, the combination of levocetirizine and montelukast treats complications associated with sepsis by blocking TLR activation through the NF-κB pathway and at least one other cellular signaling pathway selected from the group consisting of the MAPKs pathway and the IRFs pathway. In some embodiments, the combination of levocetirizine and montelukast treats complications associated with sepsis by blocking cellular signaling pathways other than those mediated by TLRs. In some embodiments, the combination of levocetirizine and montelukast reduces the activation of the NF-κB/toll-like receptors and/or other intracellular or extracellular protein complexes (e.g., exosomes, histones). In some embodiments, the combination of levocetirizine and montelukast treats complications associated with sepsis that are activated at least in part through NF-κB.

One example of the influential nature the NF-κB family of transcription factors is RANTES (regulated on activation, normal T cell expressed and secreted). In the 'late' or adaptive phase of the immune response, RANTES is a chemokine generally expressed three to five days after T-cell activation. RANTES expression, mediated exclusively through NF-κB, attracts eosinophils, monocytes, mast cells and lymphocytes, activates basophils and induces histamine release from these cells. Select H1 receptor antagonists (e.g., levocetirizine) have the remarkable ability to inhibit NF-κB and activator protein-1 (AP-1) activity though H1 receptor—dependent and independent mechanisms.

Levocetirizine has been shown to inhibit human rhinovirus (HRV)-induced ICAM-1, cytokine expression, and viral replication in airway epithelial cells from both the nose and lung. Overexpression of the H1 receptor in the laboratory resulted in the inhibition of the HRV-induced upregulation of ICAM-1, 11-6, TLR3 expression and NF-κB activation. Levocetirizine reduced the levels of HRV-induced increases in ICAM-1 regardless of whether the levocetirizine was added before, after, or at the time of the HRV infection. The results were in agreement with previous research on the inhibitory effects of levocetirizine ICAM-1 up-regulation.

Without being bound to any particular theory, it is also believed that the combination of levocetirizine and montelukast may affect treatment of complications associated with sepsis through anti-oxidative properties. For instance, it is believed that montelukast has antioxidant properties and that levocetirizine can enhance these anti-oxidative properties when administered concomitantly with montelukast (e.g., at a time when montelukast is present in the body). In some embodiments, the combination of levocetirizine and montelukast acts as an antioxidative for complications associated with sepsis. In some embodiments, the combination of levocetirizine and montelukast acts synergistically as an antioxidative combination for the treatment or complications associated with sepsis.

In some embodiments, the methods described herein involve identifying a patient (e.g., a subject) in need of treatment. In some embodiments, a patient may comprise any type of mammal (e.g., a mammal such as a human, cow, sheep, horse, cat, dog, goat, rodent, etc.). In some embodiments, patients in need of treatment include those who are at risk for contracting sepsis, have had their circulatory system compromised (e.g., by a cut, through surgery, wounds), etc.), or that are suffering from sepsis. In some embodiments, patients at risk for sepsis include subjects having undergone surgery, patients in the ICU, patients with an in-dwelling catheter, the elderly (e.g., equal to or greater than 65, 75, or 80 years of age), the young (e.g., equal to or less than under 5, 7, or 10 years of age), immunocompromised patients (e.g., those undergoing chemotherapy treatment, those on mechanical ventilation, those suffering from HIV, leukemia, cold, influenza, coronavirus disease (covid, e.g., COVID-19, SARS-CoV-2), pneumonia, lung infection, kidney infection, infections of the abdominal region, etc.), and those suffering from severe wounds or burns. In some embodiments, patients in need of treatment can include those who are at a high likelihood of developing complications associated with sepsis due to lifestyle variables (e.g., working in an area where microbes or viruses are present, etc.). In some embodiments, for patient groups, the combination of levocetirizine and montelukast can be administered preventatively for at risk patients or curatively patients suffering from sepsis. In some embodiments, for patient groups (e.g., at risk or suffering from sepsis), the combination of levocetirizine and montelukast can be administered preventatively or curatively after about age: 1, 5, 10, 20, 30, 40, 50, 60, 70, 80, 90, or ranges including and/or spanning the aforementioned values, and throughout the rest of the patient's life.

In some embodiments, the combination of levocetirizine and montelukast can be used to treat a patient having sepsis caused by a viral infection or bacterial infection. In some embodiments, the sepsis is of viral origin. In some embodiments, the source of sepsis is a viral infection caused at least in part from one or more of rhinovirus, coronavirus, influenza, human parainfluenza virus, human respiratory syncytial virus, adenovirus, enterovirus, and metapneumovirus or Epstein Barr virus. In some embodiments, the sepsis is of bacterial origin. In some embodiments, the source of sepsis is a bacterial infection caused at least in part from one or more of *Streptococcus pneumoniae, Haemophilus influenzae, Moraxella catarrhalis, Staphylococcus aureus,* other streptococci species, anaerobic bacteria, and gram negative bacteria. In some embodiments, the combination of levocetirizine and montelukast can be administered to a patient at risk for, or suffering from, sepsis caused by any of the viral or bacterial agents disclosed herein.

Once identified as a patient, the combination of levocetirizine and montelukast is administered to the patient for a period of time. In some embodiments, the period of administration comprises a period starting when the patient first displays symptoms, or when the patient has displayed symptoms for a period of more than about 1 hour, 1 day, about 2 days, or ranges spanning and/or including the aforementioned values. In some embodiments, the combination is administered until a time when the complications associated with sepsis are controlled or cured (e.g., the acute symptoms have subsided, symptoms have decreased to a baseline, risk factors for death have decreased, etc.), or for a prescribed period of time of less than about 1 week, about 2 weeks, about 3 weeks, about a month, about two months, about 6 months, or about a year. In some embodiments, the period of time comprises a period spanning from when the patient or an administrator of treatment (e.g., a doctor, nurse, medic, technician, relative, etc.) suspects the patient has sepsis to a time when the patient is no longer at risk of developing complications associated with sepsis. In some embodiments, the combination of levocetirizine and montelukast is given to alleviate symptoms of sepsis and the combination is given for the duration of the symptoms. In some embodiments, the combination of levocetirizine and montelukast is administered preventatively for a period during high exposure risk or during a period when the sepsis exposure is likely (e.g., working in remote areas, where sepsis is common, etc.).

In some embodiments, the combination of levocetirizine and montelukast is administered to and/or treats septic thrombophlebitis. In some embodiments, the combination of levocetirizine and montelukast is administered to and/or treats a patient suffering from Lemierre's Syndrome.

In some embodiments, dosing and delivery of the combination of levocetirizine and montelukast can be performed for periods between five days—twelve months to achieve continuous tissue levels of the drug combination. In some embodiments, dosing and delivery of levocetirizine and montelukast can be performed for periods of at least about: 1 day, 5 days, 10 days, 20 days, 30 days, 50 days, 100 days, 200 days, 300 days, or ranges including and/or spanning the aforementioned values. In some embodiments, the rationale is to achieve sustained tissue levels to modulate NF-κB at multiple targets within the immune system (Constant overexpression of the H1 Receptor).

In several embodiments, using the combination as disclosed herein, the average time course of sepsis (or a symptom or indicator thereof) is shortened by equal to or at least about: 10%, 20%, 30%, 40%, 50%, 60%, 70%, or ranges including and/or spanning the aforementioned values. In several embodiments, using the combination as disclosed herein, the average time course of sepsis or a symptom or indicator thereof is shortened by equal to or at least about: 2.5 days, 5 days, 7.5 days, 10 days, or ranges including and/or spanning the aforementioned values. In several embodiments, using the combination as disclosed herein, the average time course of treatment with antimicrobial agents and/or antibiotics can be reduced by a period of equal to or at least about: 2.5 days, 5 days, 7.5 days, 10 days, or ranges including and/or spanning the aforementioned values.

In some embodiments, the levocetirizine montelukast combination is administered in a sequential manner. In some embodiments, levocetirizine is administered first. In some embodiments, montelukast is administered first. In some embodiments, the combination is administered in a substantially simultaneous manner.

In some embodiments, the combination is administered to the patient by one or more of the routes consisting of enteral, intravenous (including, but not limited to a long-acting injectable, e.g., an extended release preparation), intraperitoneal, inhalation, intramuscular (including, but not limited to a long-acting injectable, subcutaneous and oral). In some embodiments, the levocetirizine and montelukast are administered by the same route. In some embodiments, the levocetirizine and montelukast are administered by different routes. In some embodiments, the combination is dosed to the patient using an effective amount of a combination of levocetirizine and montelukast.

In some embodiments, levocetirizine and montelukast are provided in long-acting delivery formats to treat the complications associated with sepsis. In some embodiments, the long acting delivery formats deliver therapeutic doses of levocetirizine and montelukast for periods of at least about: 1 week, 2 weeks, 1 month, 6 months, or ranges including and/or spanning the aforementioned values. In some embodiments, levocetirizine and montelukast are provided in fast-acting delivery formats to treat the complications associated with sepsis. In some embodiments, the levocetirizine and montelukast are provided in once-daily or multiple-daily doses. In some embodiments, traditional oral delivery systems: film strips, bilayer tablets, capsules, tablets, nebulized therapy, etc. could be utilized if administered on at least a twice daily regimen, early in the course of the complication, i.e., the first seventy-two hours. Otherwise, with the onset of nausea and diarrhea, or manifestation of any other systemic indicator, e.g., shortness of breath, hypotension, rapid pulse, fever, etc., an IV (intravenous), IM (intramuscular) or LAI (long-acting injectable) can be successful in changing the outcome.

Depending upon the patient's age, weight, BMI (body mass index) and severity of the disease on presentation, the dosing (oral, IV, IM) or dose (LAI) can be titrated to effect over the following range:

Levocetirizine: 1.25 mg-30 mg/24 hours

Montelukast: 4 mg-50 mg/24 hours for a duration of at least five days

In some embodiments, the dose is adjusted depending on the patient's response to the combination or depending on the progression of the disease state.

In some embodiments, the typical daily dosage for levocetirizine is about 5 mg, about 10 mg, about 15 mg for adults. Studies in humans have shown that doses of levocetirizine up to 30 mg/day can be safely administered. In some embodiments, daily doses of levocetirizine can be at least about 1 mg, about 5 mg, about 10 mg, about 20 mg, about 30 mg, about 40 mg, about 50 mg, about 100 mg, about 500 mg, or ranges including and/or spanning the aforementioned values. Montelukast, a leukotriene receptor antagonist, acts concurrently to protect the airway as well as to block mediators in the inflammatory cascade. The typical daily dosage of montelukast is 10 mg for adults. Montelukast has been administered at doses up to 200 mg/day to adult patients for 22 weeks and in short-term studies, and up to 900 mg/day to patients for approximately one week without clinically relevant side effects. In some embodiments, daily doses of montelukast can be at least about 1 mg, about 5 mg, about 10 mg, about 20 mg, about 30 mg, about 40 mg, about 50 mg, about 100 mg, about 200 mg, about 400 mg, about 600 mg, about 800 mg, about 1000 mg, about 2000 mg, about 4000 mg, about 6000 mg, or ranges including and/or spanning the aforementioned values.

In some embodiments, levels of levocetirizine utilized in the laboratory model can be safely achieved in a clinical setting; however, are above the standard adult dose of 5 mg daily used for the treatment of allergy and asthma. In some embodiments, the addition of montelukast, also above the standard 10 mg adult dose for allergy and asthma results in a remarkable synergistic effect which has been shown in our clinical setting to safely decrease the symptoms and duration of select viral infections (e.g., human rhinovirus, influenza).

Given the half-lives of the molecules and other pharmacokinetic considerations, once oral daily dosing, particularly in acutely ill patients, may not be effective. As such, in some embodiments, in a difficult-to-treat or harsh environment, a long-acting injectable may be employed. In some embodiments, a formulation (e.g., a long-acting injectable) comprising 50-100 mg of levocetirizine and 100-200 mg of montelukast within a pharmaceutically acceptable medium or as a pharmaceutically acceptable medium (e.g., reconstituted lyophilized powder) is dosed to maintain a steady state level for seven days. In some embodiments, the injectable can be configured to deliver the oral equivalent of between mg and 20 mg of levocetirizine and between 10 mg and 40 mg of montelukast to the patient per day (depending on the nature and extent of the disease process; taking into consideration patient weight, age, etc.). In some embodiments, oral dosing can also be used where appropriate dosing is between 5 mg and 20 mg of levocetirizine and between 10 mg and 40 mg of montelukast/day, respectively. Divided oral daily dosing may be employed. In some embodiments, the formulation comprises about 50 mg, about 100 mg, about 150 mg, about 200 mg, about 300 mg, about 400 mg, about 500 mg, or more of levocetirizine. In some embodiments, the formulation comprises about 50 mg, about 100 mg, about 150 mg, about 200 mg, about 300 mg, about 400 mg, about 500 mg, or more of montelukast.

In some embodiments, long-acting comprises injectables that peak in a short period of time (e.g., within about 1-3 hours, or less than about 1 hour, about 2 hours, about 3 hours, about 4 hours, about 5 hours, or ranges including and/or spanning the aforementioned values). In some embodiments, long-acting injectables are those that maintain a nearly constant plasma or CNS level for a sustained period of time (e.g., at least about 3 days, about 4 days, about 5 days, about 6 days, about 7 days, about 14 days, about 21 days, about 28 days or more, or ranges including and/or spanning the aforementioned values). In some embodiments, a nearly constant blood concentration is one that is about 25 ng/mL (combined plateau of both drugs), about 50 ng/mL, about 150 ng/mL, about 250 ng/mL, about 350 ng/mL, about 450 ng/mL, about 550 ng/mL, about 650 ng/mL more than about 650 ng/mL, or ranges including and/or spanning the aforementioned values (plus or minus about 25-50 ng/mL).

The technology has evolved to repurpose levocetirizine+montelukast in a long-acting injectable. This concept is particularly useful: (a) where the patient is unable to swallow, (b) where the patient is unconscious, (c) where there are limited resources for overall care and management, (d) for prophylaxis in a time of war, (e) for use as a bioterrorist counteragent, and (f) during travel in space.

Predictive modelling software can be utilized to take existing information on the API (active pharmaceutical ingredient), excipients, the desired release profile, and end environment (body v CNS) and calculate a formulation which can then be used to manufacture microparticles that encapsulate the API and release it at a desired rate. Using computer metrics, the laboratory to manufacturing formulation variances can be minimized during the design phase.

Delivery vehicles include but are not limited to injectable microparticles, nanoparticles, matrix implants, and device coatings. Release profiles can be designed as constant rate (where doses are released at desired profiles for a period of days, weeks, or months), delayed release, or sequential release. In some embodiments, a wide variety of controlled release systems can be formulated. In some embodiments, the delivery vehicle is selected from the group consisting of injectable microparticle, nanoparticles, pellets, rods discs, tablets, thin film coatings, matrix implants, device coatings, and combinations thereof. In some embodiments, the delivery vehicle formulated from one or more of Poly(lactic-co-glycolic acid) (PLGA), Polyanhydrides (PSA, PSA:FAD), Polylactides (PLA), Poly-ortho-esters (POE), or HPMC hydrogels. The release profile can be tailored between Constant Rate (days, weeks, months), Delayed Release, and Sequential Release.

Without being bound to a particular theory, delivery of levocetirizine and montelukast (e.g., sustained, intermittent, or otherwise) will stabilize NF-κB through the overexpression of the H1-receptor in a dose-dependent manner.

In some embodiments, oral BID dosing can be used to saturate levocetirizine and montelukast receptors in an estimated ratio of 3 mg/6 mg (respectively) one in the AM and two HS. Separately, 6 mg/12 mg at night for long-term treatment. In some embodiments, where therapy would be long-term, months to years, qd to bid with an optimal daily dosing range of 6-9 mg/12-18 mg: levo/monte; titrated to effect as determined from monthly to quarterly patient visits, neuropsychiatric assessments at six month intervals and QOL questionnaires at each patient visit. In some embodiments, both molecules cross the blood-brain barrier at 0.1 mg/kg. In some embodiments, lower (or higher) dosing could be used.

In some embodiments, the combination of levocetirizine and montelukast can be given instead of, or in conjunction with, existing therapeutic protocols for the treatment of sepsis.

In some embodiments, the combination of levocetirizine and montelukast (or one or more of levocetirizine and montelukast) is formulated for intravenous (IV) delivery. In some embodiments, one or more of levocetirizine and montelukast, or the combination of levocetirizine and montelukast is formulated in combination with one or more intravenous antibiotics. In some embodiments, one of levocetirizine and montelukast is administered intravenously while the other is administered orally or by another route as disclosed herein. In some embodiments, one or more of levocetirizine and montelukast is administered intravenously while an antibiotic is administered orally or by another route as disclosed herein. In some embodiments, one or more of levocetirizine and montelukast is administered orally while an antibiotic is administered intravenously or by another route as disclosed herein.

Some embodiments include a kit comprising the combination of levocetirizine and montelukast. In some embodiments, the kit includes a saline IV bag. In some embodiments, the kit includes instructions for mixing one or more of the combination of levocetirizine and montelukast with the IV saline. In some embodiments, the kit includes one or more of needles, tubing, syringes, antiseptic swabs, or the like.

EXAMPLES

Example 1: Sepsis in an 18-Year-Old Female

Figure 5:
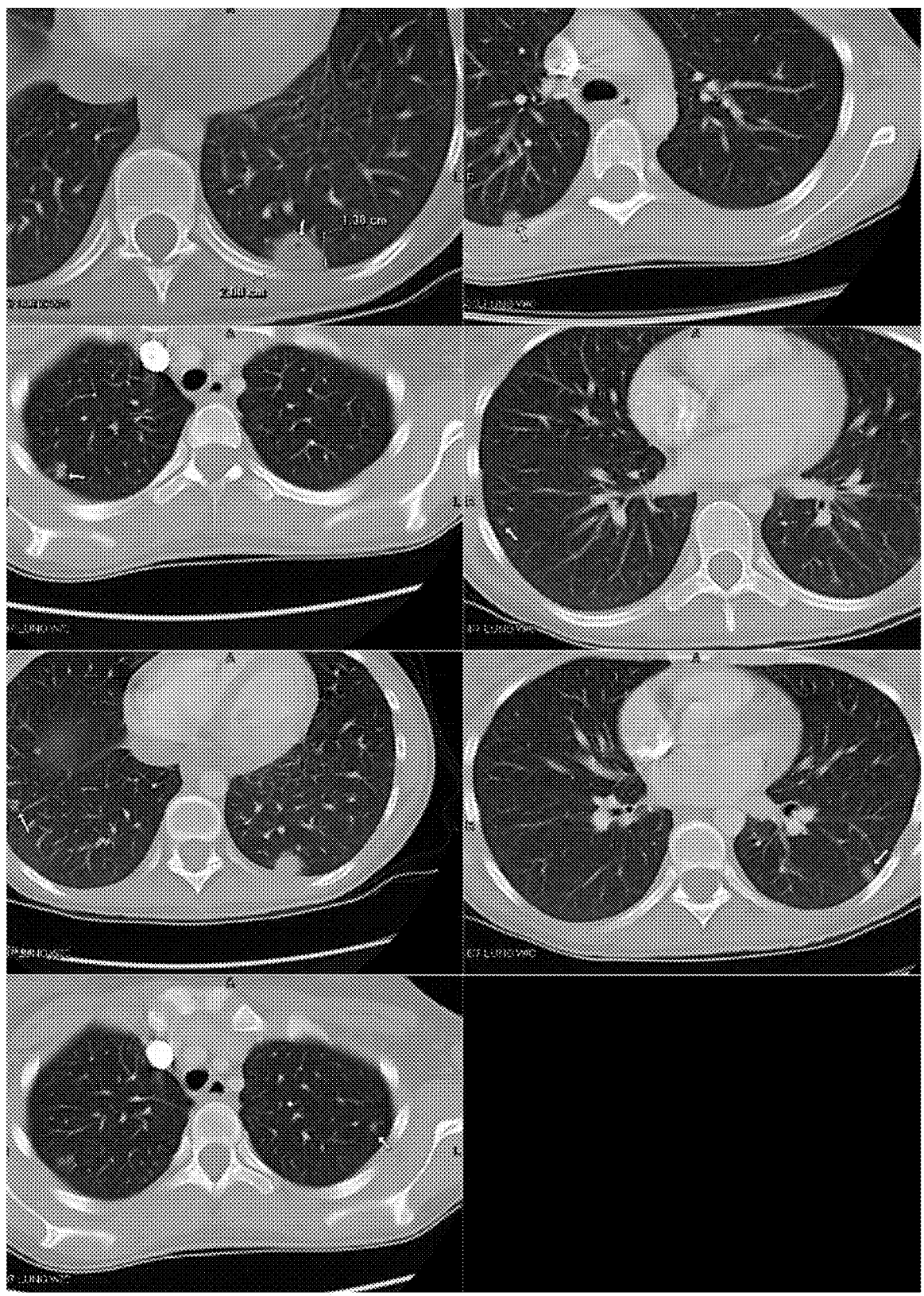
FIG. 5 is a CT Scan of the chest of a patient suffering from multiple septic emboli due to Lemierre's Syndrome.

Diagnosis:
Lemierre's Syndrome: thrombosis of the left pharyngeal venous system/internal jugular vein; pulmonary septic emboli
History: 18-year-old female with the onset of a left unilateral sore throat while traveling in Europe during the month of July. Increasing symptoms including cough, fever, shortness of breath and generalized malaise led subsequently to the initiation of azithromycin completed July 23. Failure to improve led to a re-evaluation in a hotel in Nice, France by a local physician and initiation of amoxicillin 500 mg orally three times a day on July 24. Persistent fevers, sore throat, and cough heralded an early return from Europe on July 27; evaluation in Santa Barbara, CA late that evening. The preliminary workup included the following:
CT Scan of the Neck: Thrombosis of the left pharyngeal venous system with partial opacification of the left internal jugular vein; asymmetric thickening of the left lateral oropharyngeal wall; multiple prominent cervical nodes in the left>right neck
Laboratory Data: WBC—9.7 k/μL (nl: 4.0-10.0 k/μL); hemoglobin—10.2 g/dl (nl: 11.0-15.5 g/dl); hematocrit—32.5% (nl: 34.9-47.0%); platelet count: 75 k (nl: 150-450 k/μL);
C-reactive protein—102 mg/L (normal <2.9 mg/L); procalcitonin—12.03 ng/ml (<0.5 ng/ml); albumin: 2.8 g/dL (3.4-5.0 g/dL); BUN—13 mg/dL (nl: 7-24 mg/dL); creatinine—0.74 mg/dL (nl: 0.55-1.02 mg/dL); PT 12.8 sec (nl: 11-13.5 sec); INR 1.2 (nl: 0.8-1.1)
Cultures (on amoxicillin): Pharyngeal×2, blood×2; all negative; nasal swab for methicillin resistant Staph aureus (MRSA)—negative
Surgery: Dental extraction (3rd molars): June 27
Allergies to medications: none
Social history: student
Habits: denied use of tobacco products, alcohol, and drugs
Pertinent Physical Examination: weight: 123 #(55.9 kg); 67" (170 cm); BMI: 19.26 kg/m$^2$
Initial vital signs: temperature—36.7° C. (98.1° F.); blood pressure—102/60; heart rate: 90; respiratory rate: 16; O2 saturation: 100% on room air
General: pale female complaining of fatigue and lightheadedness
Throat: 1.75/4+ tonsils; no asymmetric swelling, no peritonsillar hue, no shift of the uvula, no significant erythema
Neck: fullness and pain to palpation in the left upper neck (diffuse swelling); 2+ tender, no overlying erythema
Lungs: few scattered rales
Heart: regular rhythm and rate, no murmur
Medications: Antibiotics: piperacillin/tazobactam IV—3 grams q 6 hours; ceftriaxone IV—2 grams q 24 hours
levocetirizine: 5 mg orally q 12 hours
montelukast: 10 mg orally q 12 hours
CT Scan of the Chest July 28: scattered, irregular nodular and ground-glass opacities are seen in both lungs. The largest of these measures 2.0×1.4×2.4 cm in the posterior right lower lobe with a small central lucency suggesting cavitation (septic emboli). FIG. 5 shows a CT Scan of the Chest depicting multiple septic emboli.

Hospital Course:

The patient responded rapidly to dual IV antibiotic therapy, levocetirizine orally twice daily and montelukast 10 mg orally twice daily. An echocardiogram on July 29 (hospital day #2) delineated no vegetations on the cardiac valves; small pericardial effusion. By hospital day four she was feeling much better with no shortness of breath, and exhibited decreasing cough, left unilateral sore throat and left upper neck pain. She complained only of mild left lateral chest wall pain. Noted on physical examination was a significant decrease in the previously documented firm area anterior to the angle of the mandible and decreased pain to palpation (1+/4+) in the upper neck.

The initial procalcitonin the evening of July 27 at 22:38 hr—12.03 had dropped to 6.02 by 23:50, July 28 and to 1.5 on July 31 (normal <0.5 ng/ml). The C-reactive protein of 102 on the evening of July 27 had correspondingly decreased to 22.4 over 3.5 days (normal <10 mg/L).

The patient was discharged home on oral amoxicillin/clavulanate (875 mg/125 mg) twice daily on hospital day four, July 27, to be followed on an outpatient basis. She completed the antibiotic in conjunction with levocetirizine and montelukast twice daily on August 10 for a total of 14 days of therapy. In review, the patient was treated with four days of intravenous antibiotics followed by ten days of amoxicillin/clavulanate. Concurrent treatment included 14 days of levocetirizine 5 mg plus montelukast 10 mg twice daily. There were no sequelae and no side effects from the therapy.

Discussion

Lemierre's Syndrome was first described in 1900 as human postanginal septicemic infection from *Fusobacterium necrophorum*, a gram-negative anaerobic bacterium. Septic pulmonary emboli are an accepted surrogate marker for the disease with internal jugular vein thrombophlebitis as inclusion criteria. The patient presented with a prodrome of fatigue, cough, unilateral sore throat, shortness of breath, and lightheadedness underscored by several abnormal laboratory values, the most significant of which were a depressed platelet count of (normal: 150-400 k/µL) and elevated procalcitonin of 12.03 ng/ml (normal <0.5 ng/ml). Procalcitonin is considered a reliable early prognostic medical marker in medical patients with septic shock. A cutoff value of 6.00 ng/ml has a 76% sensitivity and 72.7% specificity for separating survivors from nonsurvivors. With respect to treatment, assuming the infection begins to clinically abate, general recommendations involve switching to an oral regimen following 2-3 weeks of intravenous therapy to complete a total of six weeks of therapy. The median duration of antimicrobial therapy, based on two large retrospective series, was 38-42 days.

The instant case is an example of the remarkable clinical response to life-threatening infection that can be safely achieved by the addition of levocetirizine and montelukast to an existing infectious disease treatment paradigm. The synergistic nature of the molecules has the ability to augment targeted therapy by significantly attenuating the inflammatory response produced by the pathogen(s). Given their unique nature, levocetirizine and montelukast have the potential to foreshorten the course of the disease while decreasing both morbidity and mortality.

Example 2

Based on the inventor's clinical experience using levocetirizine and montelukast, the following prophetic results are projected using controlled studies.

A 67-year-old male patient and a 65-year-old male patient are admitted for treatment with a urinary tract infection that led to urosepsis. Each patient experiences the following symptoms: pelvic pain, urine with a strong odor, diminished urine output, rebound pain upon removal of pressure from the abdomen, fever, vomiting, headache, chills, and nausea. The 67-year-old patient is treated with an intravenous antibiotic (piperacillin-tazobactam) and an injectable comprising 50-100 mg of levocetirizine and 100-200 mg of montelukast within a pharmaceutically acceptable medium (e.g., reconstituted lyophilized powder) dosed to maintain a steady state level for seven days. The injectable can be configured to deliver the oral equivalent of between 5 mg and 20 mg of levocetirizine and between 10 mg and 40 mg of montelukast to the patient per day (depending on the nature and extent of the disease process; taking into consideration patient weight, age, etc.). The 65-year-old patient is treated with an intravenous antibiotic (piperacillin-tazobactam) alone.

The 67-year-old patient experiences recovery from each of the symptoms of sepsis more quickly than the 65-year-old patient. The resolution of pelvic pain takes 50% less time, urine output returns to a normal odor after 50% of the time, rebound pain upon removal of pressure from the abdomen disappears in 40% of the time, fever subsides in 50% of the time, vomiting stops within 25% of the time, headache goes away within 30% of the time, chills subsides in 45% of the time, and nausea subsides in 20% of the time. The results are statistically significant.

Example 3

Based on the inventor's clinical experience using levocetirizine and montelukast, the following prophetic results are projected using controlled studies.

A cohort of 400 patients between the ages of 45-65 years of age with central line catheters is identified. The experimental group patients (n=200; "EXPT") receives levocetirizine and montelukast. The control group patients (n=200; "CONY") do not. The EXPT patients receive between 5 mg and 20 mg of levocetirizine and between 10 mg and 40 mg of montelukast orally per day (depending on the nature and extent of the disease process; taking into consideration patient weight, age, etc.).

Life threatening sepsis does not occur in any patient in the EXPT group receiving levocetirizine and montelukast. Any infection is recognized early in the disease process. Severe sepsis occurs in 1.5 percent of the CONT patients. The results are statistically significant.

Example 4

Based on the inventor's clinical experience using levocetirizine and montelukast, the following prophetic results are projected using controlled studies.

A cohort of 500 patients between the ages of 35-65 years of age scheduled for abdominal (nonobstructed small intestine) surgery is identified. Traditional prophylactic antibiotics (cefazolin) are given to both groups. The experimental group patients (n=250; "EXPT") receives levocetirizine and montelukast. The control group patients (n=250; "CONT") do not. The EXPT patients receive a long acting injectable comprising 50-100 mg of levocetirizine and 100-200 mg of montelukast within a pharmaceutically acceptable medium (e.g., reconstituted lyophilized powder) that delivers the oral equivalent of between 5 mg and 20 mg of levocetirizine and between 10 mg and 40 mg of montelukast per day.

Sepsis does not occur in any patient in the EXPT group receiving levocetirizine and montelukast. Sepsis occurs in 0.7 percent of the CONT patients. The results are statistically significant.

Example 5

Based on the inventor's clinical experience using levocetirizine and montelukast, the following prophetic results are projected using controlled studies.

A cohort of 350 immunocompromised cancer patients between the ages of 35-68 years of age are identified with opportunistic iatrogenic infections resulting in sepsis. Each patient suffers experiences one or more of the following symptoms: pelvic pain, urine with a strong odor, diminished urine output, rebound pain upon removal of pressure from the abdomen, fever, vomiting, headache, chills, and nausea. The experimental group patients (n=175; "EXPT") receives levocetirizine and montelukast. The control group patients (n=175; "CONT") do not. The EXPT patients receive intravenous antibiotics and a long acting injectable comprising 100-200 mg of levocetirizine and 200-400 mg of montelukast within a pharmaceutically acceptable medium (e.g., reconstituted lyophilized powder) that delivers the oral equivalent of between 5 mg and 20 mg of levocetirizine and between 10 mg and 40 mg of montelukast per day. The CONT group receives only intravenous antibiotics.

The EXPT patients experience recovery from each of the symptoms of sepsis more quickly than the CONT patients. The resolution of pelvic pain takes 40% of the time, urine returns to a normal odor after 50% of the time, urine output returns to a normal odor after 40% of the time, rebound pain upon removal of pressure from the abdomen disappears in 35% of the time, fever subsides in 40% of the time, vomiting stops within 30% of the time, headache goes away within 35% of the time, chills subsides in 35% of the time, and nausea subsides in 30% of the time. The results are statistically significant.

A group of 15 patients in the CONT experience septic shock during treatment and 3 patients from that group succumb to organ failure and death. Of the EXPT group, 6 patients experience severe sepsis; however, recover. There are no mortalities in the EXPT group.

Example 6

Based on the inventor's clinical experience using levocetirizine and montelukast, the following prophetic results are projected using controlled studies.

A cohort of 450 hospitalized patients between the ages of 35-65 years with COVID-19 are identified. The experimental group (n=225; "EXPT") receives levocetirizine and montelukast. The control group (n=225; "CONT") do not. The EXPT patients receive a fast-acting injectable comprising levocetirizine and montelukast within a pharmaceutically acceptable medium (e.g., reconstituted lyophilized powder) that delivers the oral equivalent of between 5 mg and 20 mg of levocetirizine and between 10 mg and 40 mg of montelukast per day.

Sepsis does not occur in any patient in the EXPT group receiving levocetirizine and montelukast. Sepsis occurs in 1.4 percent of the CONT patients. The results are statistically significant.

Example 7

Based on the inventor's clinical experience using levocetirizine and montelukast, the following prophetic results are projected using controlled studies.

A cohort of 450 hospitalized patients between the ages of 35-65 years suffering multiple organ dysfunction syndrome. The experimental group (n=225; "EXPT") receives levocetirizine and montelukast. The control group (n=225; "CONY") does not. The EXPT patients receive a fast-acting injectable comprising levocetirizine and montelukast within a pharmaceutically acceptable medium (e.g., reconstituted lyophilized powder) that delivers the oral equivalent of between 5 mg and 20 mg of levocetirizine and between 10 mg and 40 mg of montelukast per day. The mortality rate is lowered by more than 20% in the EXPT group. The results are statistically significant.

What is claimed is:

1. A method of treating a patient suffering from sepsis or septic shock, the method comprising administering to the patient an effective amount of a combination of levocetirizine and montelukast.

2. The method of claim 1, wherein the treatment causes a decrease in severity in the signs or symptoms of sepsis including one or more of fever, mental confusion, diminished urine output, inadequate blood flow, nausea, vomiting, abdominal guarding, rebound pain upon removal of pressure from the abdomen, silent abdomen, pain, redness of the skin, oliguria, coagulopathy, tachycardia, rigors, myalgia, productive cough, tachypnea, sweats, dyspnea, cellulitis, borborygmus, loose stools, hemorrhagic colitis, pyelonephritis, pneumonia, obtundation, inflammation of the abdominal cavity lining, infection of the bile duct, intestinal infarction, petechiae, purpura, purpura fulminans, malaise, myalgia, arthralgia, headache, chills, rapid heart rate or rapid breathing.

3. The method of claim 1, wherein the treatment decreases hypotension.

4. The method of claim 1, wherein the treatments decreases severe sepsis.

5. The method of claim 1, wherein the treatment decreases septic shock.

6. The method of claim 1, wherein the patient is suffering from multiple organ dysfunction syndrome and/or treatment decreases mortality associated with multiple organ dysfunction syndrome.

7. The method of claim 1, wherein the treatment decreases coagulopathy.

8. The method of claim 1, wherein the combination of levocetirizine and montelukast is administered in a sequential manner.

9. The method of claim 1, wherein the combination of levocetirizine and montelukast is administered in a substantially simultaneous manner.

10. The method of claim 1, wherein the combination is administered to the patient by one or more of the routes consisting of enteral, intravenous, intraperitoneal, inhalation, intramuscular, subcutaneous and oral.

11. The method of claim 1, wherein the levocetirizine and montelukast are administered by the same route.

12. The method of claim 1, wherein the levocetirizine and montelukast are administered via different routes.

13. The method of claim 1, wherein one or more of levocetirizine or montelukast are provided as a slow release composition.

14. The method of claim 1, wherein the combination further comprises other medications known for use in treating complications associated with sepsis.

15. The method of claim 1, wherein the combination further comprises a steroid.

* * * * *